United States Patent
Uehara et al.

(10) Patent No.: US 10,303,301 B2
(45) Date of Patent: May 28, 2019

(54) TOUCH DETECTING APPARATUS AND TOUCH DETECTION METHOD

(71) Applicant: Japan Display Inc., Tokyo (JP)

(72) Inventors: Toshinori Uehara, Tokyo (JP); Hiroshi Mizuhashi, Tokyo (JP); Toshio Soya, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/437,074

(22) Filed: Feb. 20, 2017

(65) Prior Publication Data

US 2017/0249051 A1 Aug. 31, 2017

(30) Foreign Application Priority Data

Feb. 26, 2016 (JP) .................................. 2016-036075

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04107* (2013.01); *G06F 2203/04108* (2013.01)

(58) Field of Classification Search
USPC ........................................................ 345/174
See application file for complete search history.

(56) References Cited

U.S. PATENT DOCUMENTS

| | | | |
|---|---|---|---|
| 2007/0229468 A1* | 10/2007 | Peng | G06F 3/044 345/173 |
| 2008/0062140 A1* | 3/2008 | Hotelling | G09G 3/3648 345/173 |
| 2010/0066692 A1* | 3/2010 | Noguchi | G06F 3/0412 345/173 |
| 2010/0073325 A1* | 3/2010 | Yang | G06F 3/044 345/174 |
| 2010/0328274 A1* | 12/2010 | Noguchi | G02F 1/13338 345/204 |
| 2011/0216210 A1 | 9/2011 | Hao | |
| 2011/0279408 A1* | 11/2011 | Urano | G06F 3/044 345/174 |
| 2014/0292700 A1* | 10/2014 | Mizuhashi | G06F 3/044 345/173 |
| 2014/0313157 A1* | 10/2014 | Ahn | G06F 3/044 345/174 |

(Continued)

FOREIGN PATENT DOCUMENTS

| | | |
|---|---|---|
| JP | 2010-019785 A | 1/2010 |
| JP | 2013-521706 A | 6/2013 |
| JP | 2014-164574 A | 9/2014 |

*Primary Examiner* — Chineyere D Wills-Burns
(74) *Attorney, Agent, or Firm* — K&L Gates LLP

(57) ABSTRACT

According to an aspect, a touch detecting apparatus includes: three or more detectors; a generating circuit that performs generation for generating a plurality of pieces of output data corresponding to a plurality of patterns and having resolution lower than resolution corresponding to the number of the detectors based on outputs from the detectors; a calculating circuit that performs calculation for calculating, for each of the detectors, a composite value to be used to derive a detection result of each of the detectors based on the pieces of output data corresponding to the patterns.

8 Claims, 28 Drawing Sheets

(56) References Cited

U.S. PATENT DOCUMENTS

| | | | |
|---|---|---|---|
| 2015/0062062 A1* | 3/2015 | Han | G06F 3/0412 345/174 |
| 2015/0177880 A1* | 6/2015 | Shin | G06F 3/0412 345/174 |
| 2017/0003807 A1* | 1/2017 | Abe | G06F 3/0416 |

* cited by examiner

ORIGINAL DATA (x)

| A0 | A1 | A2 | B0 | B1 | B2 | C0 | C1 | C2 |
| A3 | A4 | A5 | B3 | B4 | B5 | C3 | C4 | C5 |
| A6 | A7 | A8 | B6 | B7 | B8 | C6 | C7 | C8 |
| D0 | D1 | D2 | E0 | E1 | E2 | F0 | F1 | F2 |
| D3 | D4 | D5 | E3 | E4 | E5 | F3 | F4 | F5 |
| D6 | D7 | D8 | E6 | E7 | E8 | F6 | F7 | F8 |
| G0 | G1 | G2 | H0 | H1 | H2 | I0 | I1 | I2 |
| G3 | G4 | G5 | H3 | H4 | H5 | I3 | I4 | I5 |
| G6 | G7 | G8 | H6 | H7 | H8 | I6 | I7 | I8 |

BUNDLED DATA ($A_k X$)

| A' | B' | C' |
| D' | E' | F' |
| G' | H' | I' |

$$A' = \sum_{n=0}^{8} A_n \quad B' = \sum_{n=0}^{8} B_n \quad \cdots$$

FIG.20
| ORIGINAL DATA (9×9) | BUNDLED DATA (LOW-RESOLUTION FRAME: 3×3) |
|---|---|
| 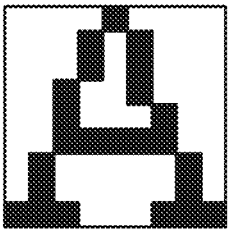 | 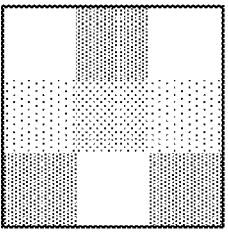 |

FIG.21
| NINE INTEGRATED OUTPUT (LOW RESOLUTION: P0 TO P8) | DETECTION RESULT (CALCULATION RESULT) OF DETECTING UNIT INCLUDED IN COMMON IN NINE INTEGRATED OUTPUT |
|---|---|
|  ×9 |  |
| 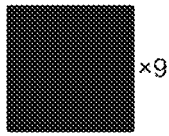 ×9 | 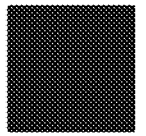 |
| 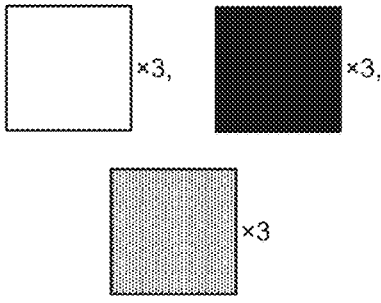 ×3, ×3, ×3 | 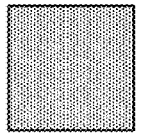 |

FIG.25

| PATTERN | ORIGINAL DATA | BUNDLED DATA |
|---------|---------------|--------------|
| Pa | y1 / y2 / y3 | PaA' |
|    | y4 / y5 / y6 | PaB' |
|    | ⋮ | ⋮ |
| Pb | y2 / y3 / y4 | PbA' |
|    | y5 / y6 / y7 | PbB' |
|    | ⋮ | ⋮ |
| Pc | y3 / y4 / y5 | PcA' |
|    | y6 / y7 / y8 | PcB' |
|    | ⋮ | ⋮ |

TOUCH DETECTING APPARATUS AND TOUCH DETECTION METHOD

CROSS-REFERENCE TO RELATED APPLICATIONS

This application claims priority from Japanese Application No. 2016-036075, filed on Feb. 26, 2016, the contents of which are incorporated by reference herein in its entirety.

BACKGROUND

1. Technical Field

The present invention relates to a touch detecting apparatus and a touch detection method.

2. Description of the Related Art

Widely known are touch detecting apparatuses that detect contact of an object and can output data indicating the shape of unevenness or the like of the detected object positioned at the contact portion. The examples of such touch detecting apparatuses include a sensor device disclosed in Japanese Patent Application Laid-open Publication No. 2010-019785, for example.

Touch detecting apparatuses can increase the intensity of signals used for detection by combining signals output from a plurality of sensors that detect contact of the object. Therefore, even when touch detection is difficult to be performed with a single sensor due to the weakness of the signal therefrom, combining the weak output signals from the plurality of sensors enables the touch detection.

Combining the output signals, however, may possibly cause the data indicating the blurred shape of the detected object to be obtained. As a result, the conventional touch detecting apparatuses may possibly have reduced accuracy in detecting the shape of the object because of the blur.

For the foregoing reasons, there is a need for a touch detecting apparatus and a touch detection method that can increase the accuracy in detecting the shape of an object.

SUMMARY

According to an aspect, a touch detecting apparatus includes: three or more detectors that are aligned in at least one direction and that individually detect a touch operation; a generating circuit that performs generation for generating a plurality of pieces of output data corresponding to a plurality of patterns and having resolution lower than resolution corresponding to the number of the detectors based on outputs from the detectors; a calculating circuit that performs calculation for calculating, for each of the detectors, a composite value to be used to derive a detection result of each of the detectors based on the pieces of output data corresponding to the patterns; and a determining circuit that performs determination for redetermining a new value for an initial value corresponding to a predetermined value set for each of the detectors, based on a difference between the initial value and the composite value calculated for each of the detectors. The generating circuit generates the output data using an integrated output obtained by integrating outputs from a plurality of detectors serving as a single group that are part of the three or more detectors and consecutively aligned. Combinations of the detectors serving as the single group are different between the patterns. Arrangement of the detectors serving as the single group is shifted by a predetermined shift amount between two different patterns. The predetermined shift amount is smaller than the width of a group area in an alignment direction of the detectors, the group area being an area in which the detectors serving as the single group are arranged.

According to another aspect, a touch detection method for performing touch detection based on outputs from three or more detectors that are aligned in at least one direction and that individually detect a touch operation includes: generating a plurality of pieces of output data corresponding to a plurality of patterns and having resolution lower than resolution corresponding to the number of the detectors based on outputs from the detectors; calculating, for each of the detectors, a composite value to be used to derive a detection result of each of the detectors based on the pieces of output data corresponding to the patterns; and redetermining a new value for an initial value corresponding to a predetermined value set for each of the detectors based on difference between the initial value and the composite value calculated for each of the detectors. The output data is generated using an integrated output obtained by integrating outputs from a plurality of detectors serving as a single group that are part of the three or more detectors and consecutively aligned. Combinations of the detectors serving as the single group are different between the patterns. Arrangement of the detectors serving as the single group is shifted by a predetermined shift amount between two different patterns. The predetermined shift amount is smaller than the width of a group area in an alignment direction of the detectors, the group area being an area in which the detectors serving as the single group are arranged.

BRIEF DESCRIPTION OF THE DRAWINGS

FIG. 13 is a diagram of an example of selection patterns of the detectors to be handled as a single group;

FIG. 19 is a schematic diagram illustrating the relation between a plurality of pieces of integrated data including outputs from the detectors and values obtained by combining the pieces of integrated data;

FIG. 20 is a diagram of a schematic example visually representing the relation between the pieces of integrated data and the values obtained by combining the pieces of integrated data illustrated in FIG. 19;

FIG. 21 is a diagram schematically illustrating processing for generating high-resolution data by combining low-resolution data;

FIG. 25 is a diagram of another example of the selection patterns and the low-resolution data corresponding to the selection patterns;

DETAILED DESCRIPTION

Figure 1:
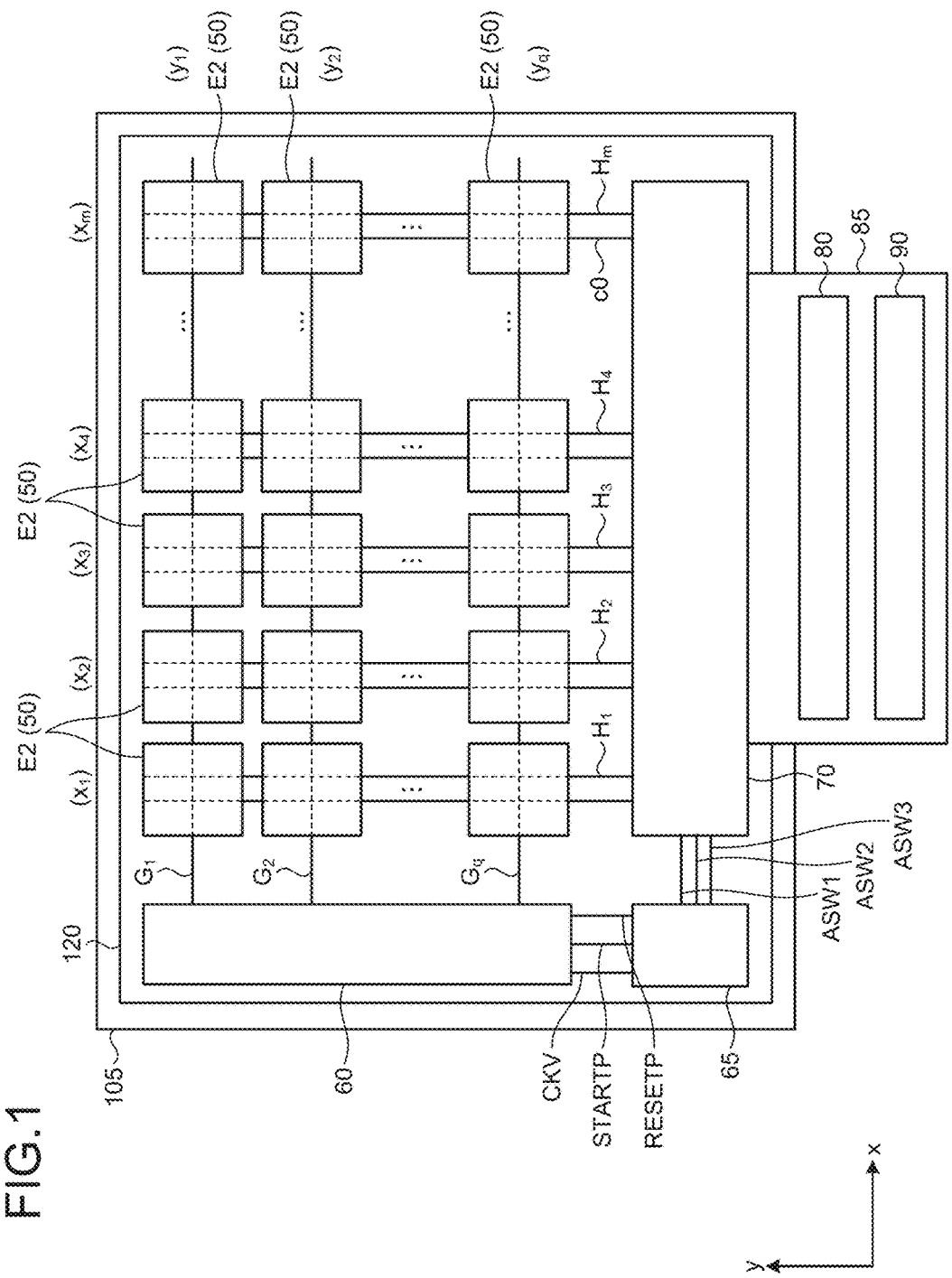
FIG. 1 is a schematic diagram illustrating an example of a main configuration of a touch detecting apparatus according to an embodiment.

Exemplary embodiments according to the present invention are described below with reference to the accompanying drawings. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to preceding figures are denoted by the same reference numerals, and detailed explanation thereof may be appropriately omitted.

In this disclosure, when an element is described as being "on" another element, the element can be directly on the other element, or there can be one or more elements between the element and the other element.

FIG. 1 is a diagram schematically illustrating an example of a main configuration of a touch detecting apparatus according to an embodiment. The touch detecting apparatus includes detectors 50, a driver 60, a selector 70, an analog/digital (A/D) converter 80, and an arithmetic processing circuit 90, for example.

In the following description, an operation relating to "proximity or contact of an object to or with a detection area" may be referred to as a "touch operation". In addition, "detection of proximity or contact of an object" may be referred to as "touch detection". The detectors 50 detect a touch operation. Specifically, the detectors 50 serve as touch detection electrodes E2 arranged in a two-dimensional (e.g., planar) detection area to detect contact of the object (e.g., a finger of a person). The detectors 50 according to the present embodiment detect the touch operation by a self-capacitive system.

Figure 2:
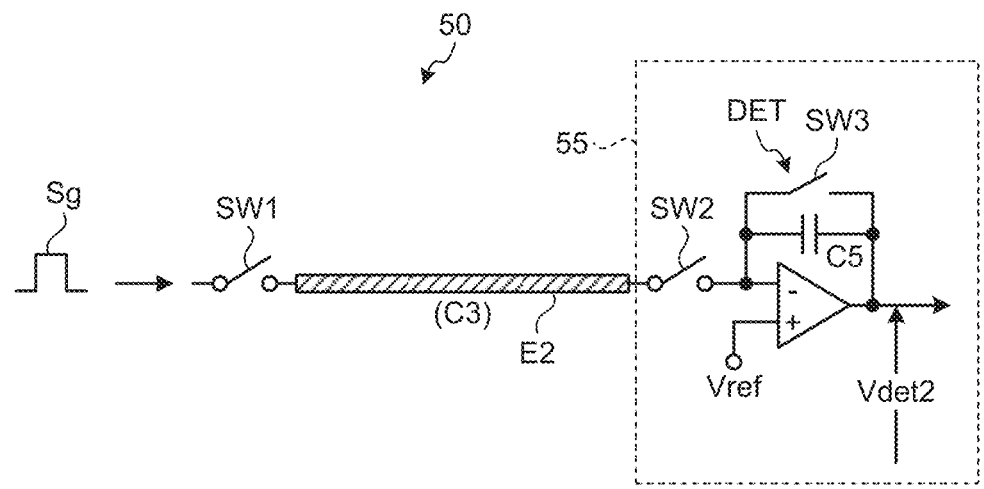
FIG. 2 is a diagram for explaining a basic principle of self-capacitive touch detection and illustrates a state where a finger is neither in contact with nor in proximity to a touch detection electrode.
Figure 3:
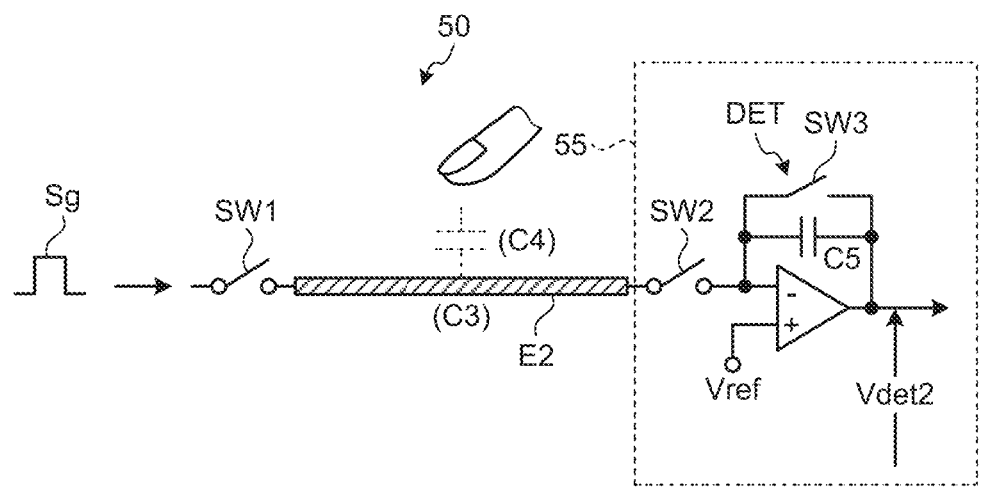
FIG. 3 is a diagram for explaining the basic principle of self-capacitive touch detection and illustrates a state where a finger is in contact with or in proximity to the touch detection electrode.
Figure 4:
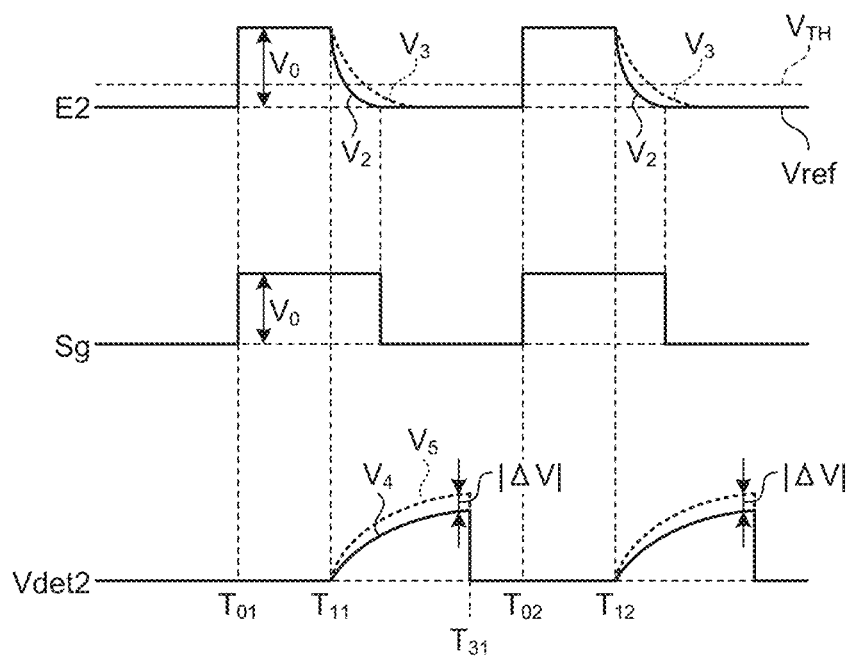
FIG. 4 is a diagram of an example of waveforms of a drive signal and a touch detection signal.

The following describes a basic principle of self-capacitive touch detection with reference to FIGS. 2 to 4. FIG. 2 is a diagram for explaining the basic principle of self-capacitive touch detection and illustrates a state where a finger is neither in contact with nor in proximity to a touch detection electrode. FIG. 3 is a diagram for explaining the basic principle of self-capacitive touch detection and illustrates a state where a finger is in contact with or in proximity to the touch detection electrode. FIG. 4 is a diagram of an example of waveforms of a drive signal and a touch detection signal. A circuit 55 illustrated in FIGS. 2 and 3 is coupled to the detector 50 via the selector 70 and serves as a function of the A/D converter 80, for example.

As illustrated in FIG. 2, in a state where a finger is neither in contact with nor in proximity to the touch detection electrode, an alternating-current (AC) rectangular wave Sg having a predetermined frequency (e.g., a frequency on the order of several kilohertz to several hundred kilohertz) is applied to the touch detection electrode E2. The touch detection electrode E2 has capacitance C3, and an electric current depending on the capacitance C3 flows. A voltage detector DET converts change in the electric current depending on the AC rectangular wave Sg into change in voltage (waveform $V_4$ indicated by the solid line (refer to FIG. 4)).

As illustrated in FIG. 3, in a state where a finger is in contact with or in proximity to the touch detection electrode, capacitance C4 between the finger and the touch detection electrode E2 is added to the capacitance C3 of the touch detection electrode E2. When the AC rectangular wave Sg is applied to the touch detection electrode E2, an electric current depending on the capacitance C3 and C4 flows. As illustrated in FIG. 4, the voltage detector DET converts change in the electric current depending on the AC rectangular wave Sg into change in voltage (waveform $V_5$ indicated by the dotted line). By integrating the voltage values of the waveforms $V_4$ and $V_5$ and comparing these values, it is determined whether a finger is in contact with or in proximity to the touch detection electrode E2. Alternatively, it may be determined whether a finger is in contact with or in proximity to the touch detection electrode E2 by calculating respective periods until a waveform $V_2$ and a waveform $V_3$ illustrated in FIG. 4 decrease to a predetermined reference voltage and comparing the periods, for example.

Specifically, as illustrated in FIGS. 2 and 3, the touch detection electrode E2 can be cut off by a switch SW1 and a switch SW2. In FIG. 4, the voltage level of the AC rectangular wave Sg is raised by an amount corresponding to voltage $V_0$ at time $T_{01}$. At this time, the switch SW1 is turned on, and the switch SW2 is turned off. As a result, the voltage in the touch detection electrode E2 is also raised by $V_0$. Subsequently, the switch SW1 is turned off before time $T_{11}$. While the touch detection electrode E2 is in an electrically floating state, the electric potential in the touch detection electrode E2 is maintained at $V_0$ due to the capacitance C3 (refer to FIG. 2) of the touch detection electrode E2 or due to capacitance (C3+C4, refer to FIG. 3) obtained by adding the capacitance C4 generated by contact or proximity of a finger or the like to the capacitance C3 of the touch detection electrode E2. Subsequently, a switch SW3 is turned on before time $T_{11}$ and is turned off after a predetermined time has elapsed, thereby resetting the voltage detector DET. With this reset operation, the output voltage is made substantially equal to reference voltage Vref.

Subsequently, when the switch SW2 is turned on at time $T_{11}$, the voltage at an inversion input terminal of the voltage detector DET increases to the voltage $V_0$ equal to that of the touch detection electrode E2. Subsequently, the voltage at the inversion input terminal of the voltage detector DET decreases to the reference voltage Vref based on a time constant of the capacitance C3 (or C3+C4) of the touch detection electrode E2 and capacitance C5 in the voltage detector DET. At this time, the electric charges accumulated in the capacitance C3 (or C3+C4) of the touch detection electrode E2 move to the capacitance C5 in the voltage detector DET, whereby output (Vdet2) from the voltage detector DET increases. When a finger or the like is not in proximity to the touch detection electrode E2, the output (Vdet2) from the voltage detector DET is represented by the waveform $V_4$ indicated by the solid line, and Vdet2=C3·$V_0$/C5 is satisfied. When capacitance generated by an effect of a finger or the like is added, the output is represented by the waveform $V_5$ indicated by the dotted line, and Vdet2=(C3+C4)·$V_0$/C5 is satisfied. Subsequently, at time $T_{31}$ after the electric charges in the capacitance C3 (or C3+C4) of the touch detection electrode E2 sufficiently move to the capacitance C5, the switch SW2 is turned off, and the switch SW1 and the switch SW3 are turned on. As a result, the electric potential of the touch detection electrode E2 decreases to a low level equal to that of the AC rectangular wave Sg, and the voltage detector DET is reset. The timing to turn on the switch SW1 may be any timing after the turning off of the switch SW2 and before time $T_{02}$. The timing to reset the voltage detector DET may be any timing after the turning off of the switch SW2 and before time $T_{12}$. The operation described above is repeatedly performed at a predetermined frequency (e.g., a frequency on the order of several kilohertz to several hundred kilohertz). It can be determined whether an external proximate object is present (whether a touch operation is performed) based on an absolute value |ΔV| of the difference between the waveform $V_4$ and the waveform $V_5$. As illustrated in FIG. 4, when a finger or the like is not in proximity to the touch detection electrode, the electric potential of the touch detection electrode E2 is represented by the waveform $V_2$. By contrast, when the capacitance C4 generated by an effect of a finger or the like is added, the electric potential is represented by the waveform $V_3$. By measuring a time period until the waveforms $V_2$ and $V_3$ to decrease to predetermined voltage $V_{TH}$, it can be determined whether an external proximate object is present (whether a touch operation is performed).

Figure 5:
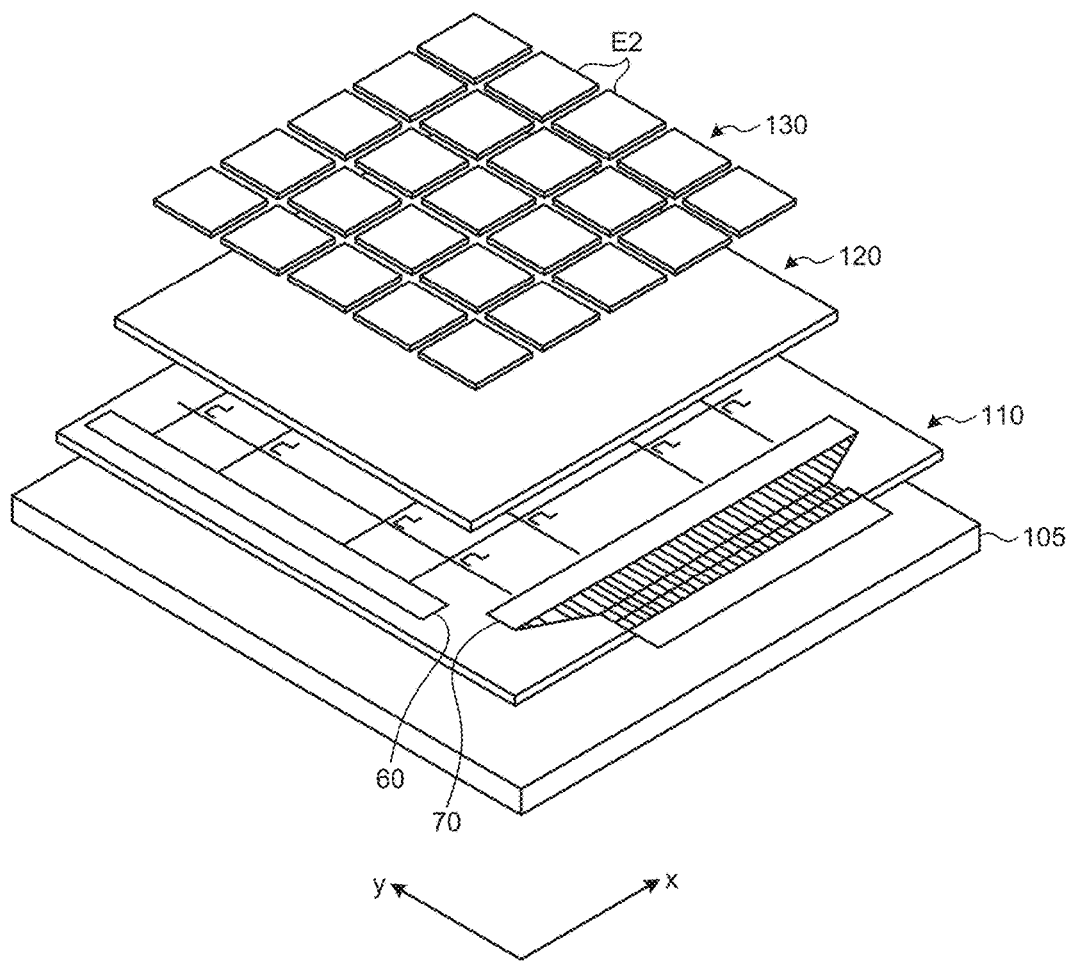
FIG. 5 is a schematic diagram of an example of a multilayered structure of the touch detecting apparatus illustrated in FIG. 1.

FIG. 5 is a schematic diagram of an example of a multilayered structure of the touch detecting apparatus illustrated in FIG. 1. As illustrated in FIG. 5, the touch detecting apparatus has a multilayered structure in which a thin-film transistor (TFT) layer 110, a shield electrode layer 120, and a touch detection electrode layer 130 are formed on a substrate 105, for example. The TFT layer 110 is provided with n-type switches N1 and p-type switches P1 (refer to FIG. 9), which will be described later. The shield electrode layer 120 is provided with a shield electrode (e.g., a planar electrode) that suppresses electric waves of noise between the touch detection electrode layer 130 and the TFT layer 110. The touch detection electrode layer 130 is provided with a plurality of touch detection electrodes E2 arranged in a matrix in two directions (e.g., an x-direction and a y-direction) orthogonal to each other. The touch detection electrodes E2 formed in the touch detection electrode layer 130 are coupled to the TFT layer 110 via coupling portions, which are not illustrated, provided in the shield electrode layer 120. The coupling portions are provided in contact holes formed in the shield electrode layer 120, for example. The substrate 105 is a glass substrate, for example. The shield electrode layer 120 and the touch detection electrode layer 130 are made of indium tin oxide (ITO), for example. The specific configuration and the form of the components may be appropriately changed.

The touch detecting apparatus according to the present embodiment includes detectors 50 arranged in a matrix of m rows×q columns along the x-direction and the y-direction. m and q are integers equal to or larger than 2. As described above, the touch detecting apparatus includes three or more detectors 50 that are aligned in at least one direction (e.g., two directions of the x- and the y-directions) and that individually detect a touch operation. The detectors 50 aligned in the x-direction may be denoted by coordinates $x_1$, $x_2$, . . . , and $x_m$ indicating the respective positions. The detectors 50 aligned in the y-direction may be denoted by coordinates $y_1$, $y_2$, . . . , and $y_q$ indicating the respective positions.

The area that includes the m×q detectors 50 and that can perform touch detection may be referred to as a detection area. The detection area corresponds to a detection surface covered with a dielectric on the upper side of the touch detection electrode layer 130, for example. When a touch operation is performed by an object (e.g., a finger of a person) in the detection area, the touch detecting apparatus detects the touch operation. The thickness of the dielectric may be appropriately changed. In a case where the TFT layer 110 of the touch detecting apparatus is provided in the same layer as that of a TFT layer of a display device provided with the touch detecting apparatus, for example, the dielectric has a thickness corresponding to the distance between the TFT layer and the touch detection surface included in a housing of the display device. Generally, as the thickness of the dielectric is thinner, the accuracy of touch detection increases.

The touch detecting apparatus includes scanning lines $G_1$, $G_2, \ldots$, and $G_q$, signal lines $H_1$, $H_2, \ldots$, and $H_m$, and a constant potential line c0. The scanning lines $G_1$, $G_2, \ldots$, and $G_q$ extend in the x-direction and couple the driver 60 to a plurality of detectors 50 aligned in the x-direction. The scanning lines $G_1$, $G_2, \ldots$, and $G_q$ are a plurality of lines and provided correspondingly to the number of detectors 50 aligned in the y-direction. The AC rectangular wave Sg serving as a drive signal for the detectors 50 is output from the driver 60 to the touch detection electrodes E2. The signal lines $H_1$, $H_2, \ldots$, and $H_m$ extend in the y-direction and couple the detectors 50 to the selector 70. The outputs (Vdet2) from the detectors 50 are transmitted to the selector 70 via the signal lines $H_1$, $H_2, \ldots$, and $H_m$. The constant potential line c0 supplies a predetermined constant potential serving as a reference potential.

The driver 60 drives the detectors 50. Specifically, the driver is a signal output circuit including what is called a shift register, for example. Based on clock signals supplied from the outside, the driver 60 outputs the drive signal while shifting the scanning lines $G_1$, $G_2$, ..., and $G_q$ to be a target to which the drive signal is output in a predetermined cycle. The combination of the detectors 50 that operate at the same time in response to the drive signal corresponds to the shift pattern of the scanning lines $G_1$, $G_2$, ..., and $G_q$ to which the driver 60 outputs the drive signal.

Figure 6:
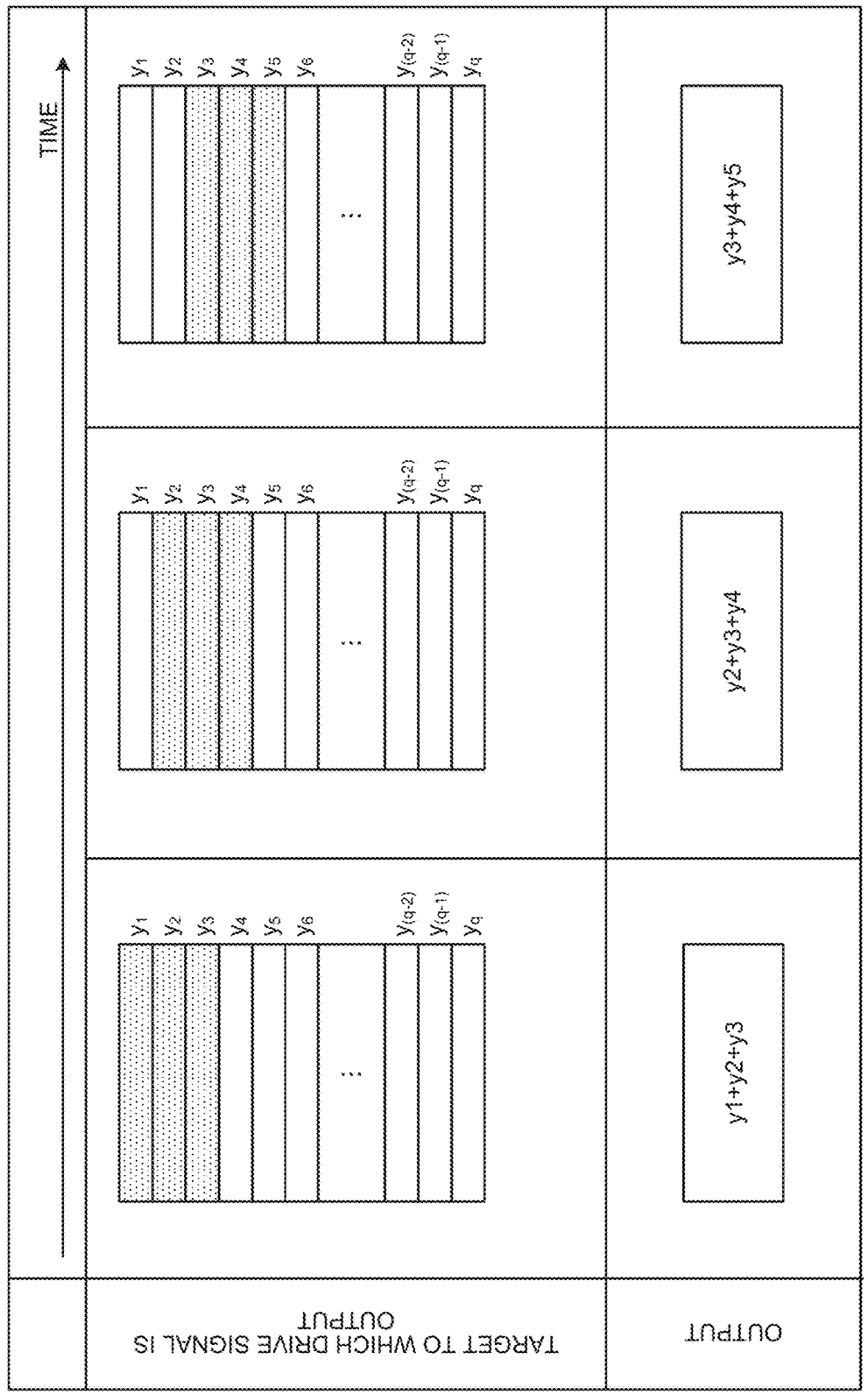
FIG. 6 is a diagram of an example of time-series shift of detectors that operate at the same time.

FIG. 6 is a diagram of an example of time-series shift of the detectors 50 that operate at the same time. In FIG. 6, the rows of the detectors 50 being driven are hatched. The driver 60 according to the present embodiment outputs the drive signal to three scanning lines (e.g., the scanning lines $G_1$, $G_2$, and $G_3$) at the same time, the three scanning lines being consecutively aligned in the y-direction. As a result, the detectors 50 of the three rows operate at the same time. The driver 60 shifts the scanning lines to be a target to which the drive signal is output one by one in the y-direction in the predetermined cycle. More specifically, the driver 60 stops outputting the drive signal to the scanning line $G_1$ positioned on one end side (e.g., upper side in FIG. 6) in the y-direction out of the three scanning lines $G_1$, $G_2$, and $G_3$ to which the drive signal has been output at the previous timing, for example. In addition, the driver 60 outputs the drive signal to the other two scanning lines $G_2$ and $G_3$ and the scanning line $G_4$ positioned on the other end side (e.g., lower side in FIG. 6) of the three scanning lines. As a result, the coordinates of the rows of the detectors 50 that operate at the same time are shifted by one row from $(y_1,y_2,y_3)$ to $(y_2,y_3,y_4)$. In the same manner as described above, the driver 60 shifts the target to which the drive signal is output from the scanning lines $G_2$, $G_3$, and $G_4$ to the scanning lines $G_3$, $G_4$, and $G_5$. As a result, the coordinates of the rows of the detectors 50 that operate at the same time are shifted by one row from $(y_2,y_3,y_4)$ to $(y_3,y_4,y_5)$. By performing three-row simultaneous drive and one-row shift on the detectors 50, the touch detecting apparatus can obtain an integrated output of the detectors 50 of the three rows while shifting the rows of the detectors 50 one by one in the predetermined cycle.

Figure 7:
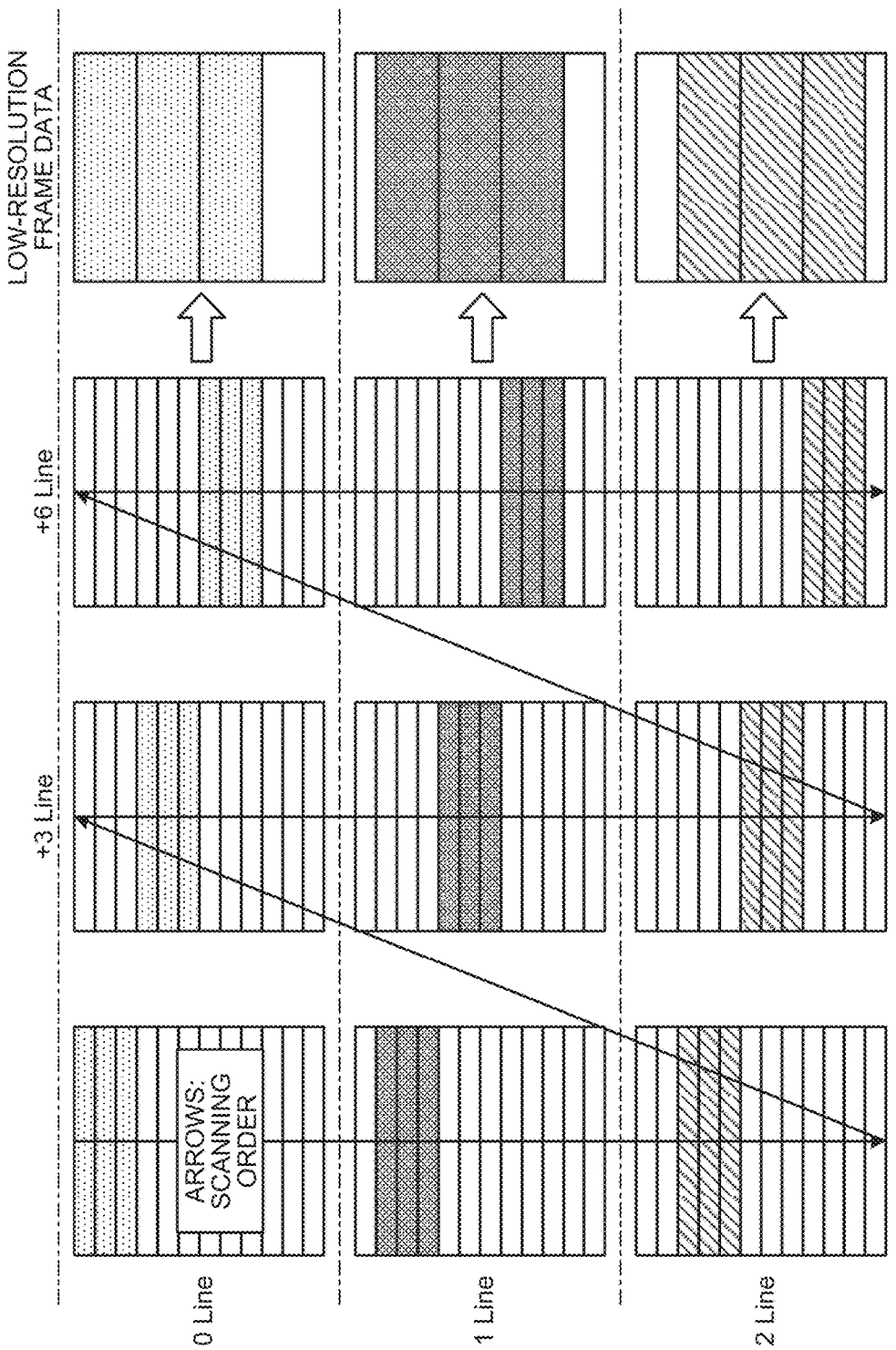
FIG. 7 is a diagram for schematically explaining three-row simultaneous drive and one-row shift.

FIG. 7 is a diagram for schematically explaining three-row simultaneous drive and one-row shift. As illustrated in FIG. 7, the touch detecting apparatus drives the detectors of three rows simultaneously (three-bundle) and shifts the electrodes to be driven row by row (one-shift), thereby obtaining image data having resolution of three rows. The touch detecting apparatus obtains first low-resolution frame data by using respective results of detection data obtained by simultaneously driving the first row to the third row, detection data obtained by simultaneously driving the fourth row to the sixth row, and detection data obtained by simultaneously driving the seventh row to the ninth row. The touch detecting apparatus obtains second low-resolution frame data by using respective results of detection data obtained by simultaneously driving the second row to the fourth row, detection data obtained by simultaneously driving the fifth row to the seventh row, and detection data obtained by simultaneously driving the eighth row to the tenth row. The touch detecting apparatus obtains third low-resolution frame data by using respective results of detection data obtained by simultaneously driving the third row to the fifth row, detection data obtained by simultaneously driving the sixth row to the eighth row, and detection data obtained by simultaneously driving the ninth row to the eleventh row. As described above, the touch detecting apparatus obtains a plurality of pieces of low-resolution frame data composed of nine consecutive rows and shifted from each other by one row. By repeating the bundling and the shifting by one row, the touch detecting apparatus can generate integrated data, that is, low-resolution frame data of the number of patterns corresponding to the number of bundled rows (e.g., three patterns in the case of three-row simultaneous drive). FIG. 7 illustrates an example of generation of the low-resolution frame data by consecutively performing one-row shift. This is given by way of example only, and the generation method may be appropriately changed. The touch detecting apparatus, for example, may perform three-row shift. In this case, the touch detecting apparatus generates the first low-resolution frame data illustrated in the upper part (0Line) of FIG. 7 first by performing three-row shift. The touch detecting apparatus then shifts the start line of three-row shift by one row, thereby generating the second low-resolution frame data illustrated in the middle part (1Line) of FIG. 7 by performing three-row shift. Subsequently, the touch detecting apparatus shifts the start line of three-row shift by one row, thereby generating the third low-resolution frame data illustrated in the lower part (2Line) of FIG. 7 by performing three-row shift. The number of scanning lines that are driven at the same time is not limited to three and may be two or more. The touch detecting apparatus uses the pieces of low-resolution frame data obtained in this manner to generate high-resolution data having resolution of one row by performing super-resolution processing using Expression (1).

The driver 60 is provided with transmission paths through which a synchronization signal (CKV), a start pulse (STARTP), and a reset pulse (RESETP) are received. The driver 60 starts an operation at an input timing of the start pulse and shifts the scanning lines $G_1$, $G_2$, ..., and $G_q$ to be a target to which the drive signal is output synchronously with a cycle (clock) of the synchronization signal. When receiving the reset pulse, the shift register in the driver 60 is returned to an initial state before the start of the operation. In the present embodiment, the touch detecting apparatus includes a control circuit 65 serving as a dedicated circuit that outputs the synchronization signal (CKV), the start pulse (STARTP), and the reset pulse (RESETP). The component having the function of the control circuit 65 may be appropriately changed. The function of the control circuit 65 may be one function of the arithmetic processing circuit 90, for example.

Figure 8:
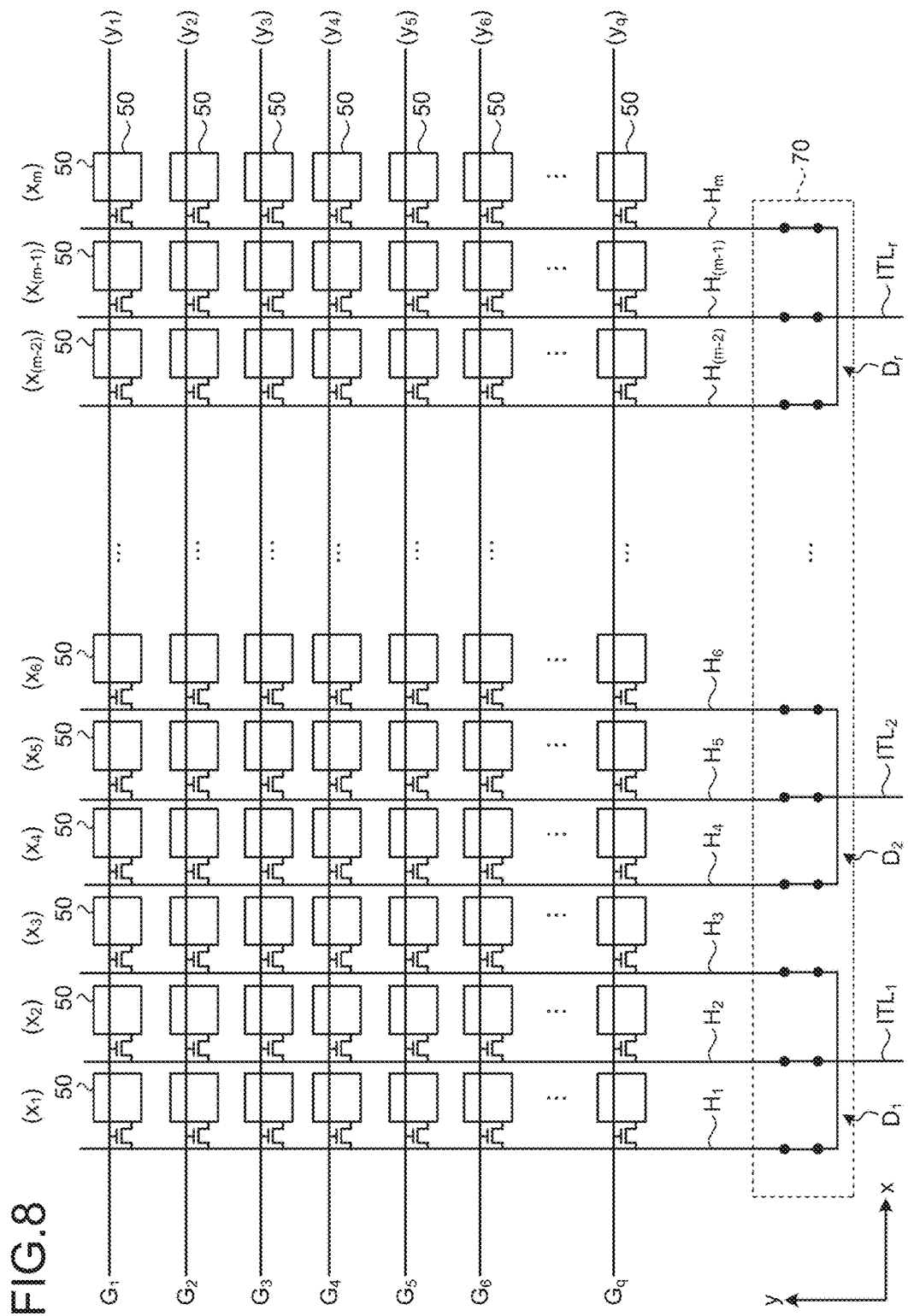
FIG. 8 is a diagram schematically illustrating a selector.

FIG. 8 is a diagram schematically illustrating the selector 70. The selector 70 has a function to integrate outputs (Vdet2) from the voltage detectors DET output via any one or more signal lines out of a plurality of signal lines coupled to the input side. Specifically, for example, the selector 70 includes a plurality of coupling circuits $D_1, D_2, \ldots,$ and $D_r$, including a switching circuit and so on. A first end (input end) of each of the coupling circuits $D_1, D_2, \ldots,$ and $D_r$ is coupled to three signal lines included in the signal lines $H_1$, $H_2, \ldots,$ and $H_m$. The three signal lines are coupled to respective three detectors 50 aligned in the x-direction are coupled to the input side. Second end sides (output sides) of the coupling circuits $D_1, D_2, \ldots,$ and $D_r$ are coupled to integration lines $ITL_1, ITL_2, \ldots, ITL_r$, respectively. The integration lines $ITL_1, ITL_2, \ldots, ITL_r$ are coupled to the A/D converter 80. Each of the coupling circuits $D_1$, $D_2, \ldots,$ and $D_r$ includes three switch circuits S1, S2, and S3 between the respective three signal lines and the integration line. The configuration of each of the switch circuits S1, S2, and S3 will be described later. With this configuration, each of the coupling circuits $D_1, D_2, \ldots,$ and $D_r$ integrates the signals received from the input side and outputs it as one signal. In the selector 70 according to the present embodiment, the number of pieces of wiring on the input side is the same as the number (m) of the signal lines $H_1, H_2, \ldots,$ and $H_m$, and the number of pieces of wiring on the output side is the same as the number (r) of the coupling circuits $D_1, D_2, \ldots,$ and $D_r$. In other words, one coupling circuit is provided to three signal lines. With this configuration, the selector 70 integrates outputs (Vdet2) from up to three detectors 50 aligned in the x-direction and outputs the integrated output from the integration line on the output side.

Figure 9:
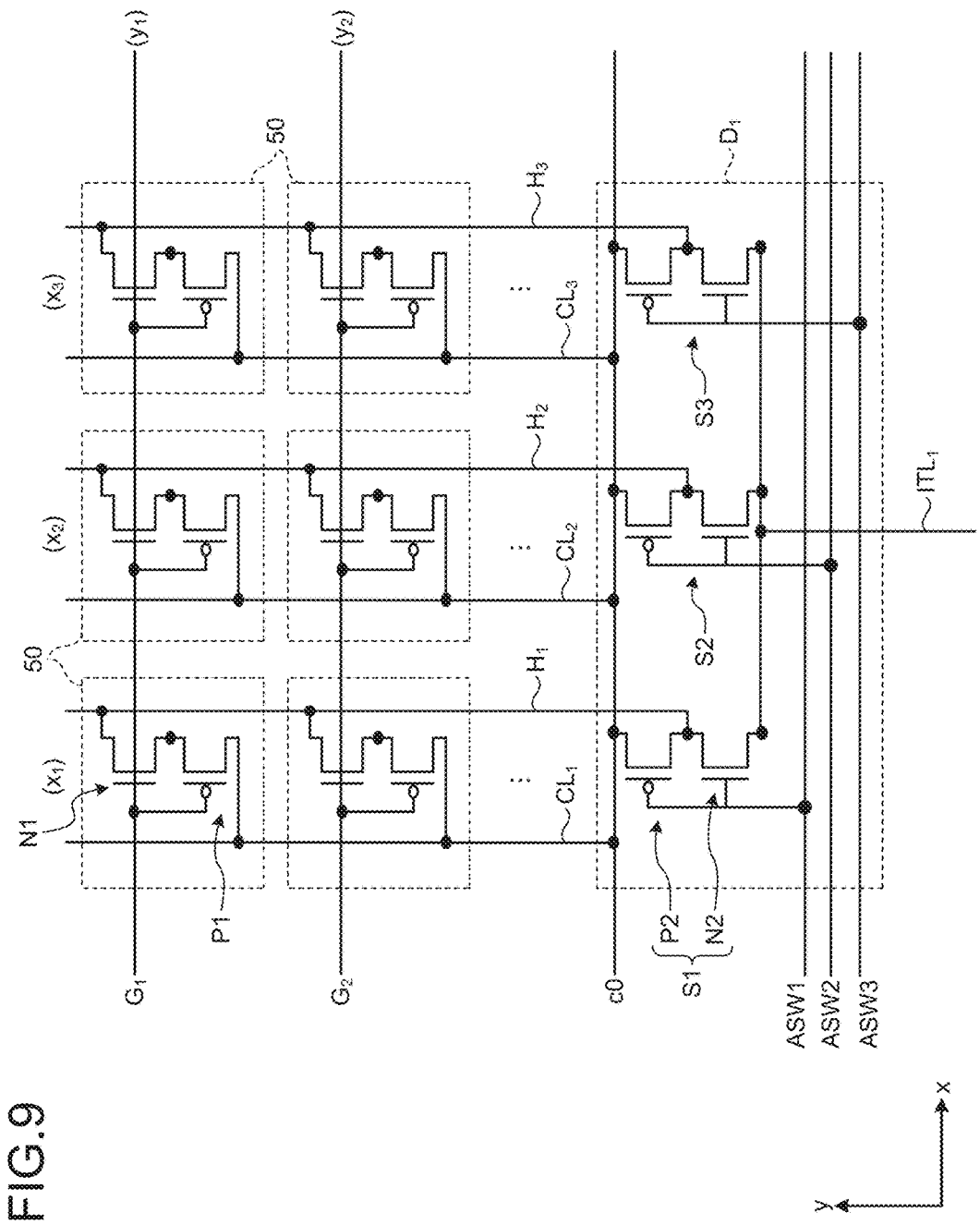
FIG. 9 is a schematic diagram illustrating an example of a circuit configuration relating to input and output in one coupling circuit.

FIG. 9 is a schematic diagram illustrating an example of a circuit configuration relating to input and output in one coupling circuit. As illustrated in FIG. 9, the coupling circuit $D_1$ is coupled to open-close signal lines ASW1, ASW2, and ASW3. In the coupling circuit $D_1$, the coupling states of the switch circuits S1, S2, and S3 are respectively changed depending on the presence (ON/OFF) of a signal supplied to the open-close signal lines ASW1, ASW2, and ASW3.

Specifically, the detectors 50 are coupled to corresponding signal lines (e.g., the signal lines $H_1$, $H_2$, and $H_3$ illustrated in FIG. 9) via the n-type switches N1. The n-type switches N1 are configured to couple the respective detectors 50 to the signal lines when the scanning lines (e.g., the scanning lines $G_1$ and $G_2$ illustrated in FIG. 9) are supplied with the drive signal (turned high). The detectors 50 are also coupled to the constant potential line c0 via the p-type switches P1. The p-type switches P1 are configured to couple the respective detectors 50 to the constant potential line c0 when the scanning lines (e.g., the scanning lines $G_1$ and $G_2$ illustrated in FIG. 9) are not supplied with the drive signal (turned low). In the present embodiment, the constant potential line c0 is coupled to coupling lines $CL_1, CL_2,$ and $CL_3$. The p-type switches P1 are configured to couple the detectors 50 to the coupling lines $CL_1, CL_2,$ and $CL_3$ to couple the detectors 50 to the constant potential line c0. While only the n-type switch N1 and the p-type switch P1 provided for the upper left detector 50 are provided with the reference numerals in FIG. 9, the other detectors are 50 also provided with the same configuration as illustrated in FIG. 9. The figures other than FIG. 9 do not illustrate the p-type switches P1 between the signal lines $H_1, H_2, \ldots$ and the detectors 50.

The detectors 50 in the row of the scanning line turned low are not coupled to the respective signal lines $H_1, H_2, \ldots$ and are coupled to the constant potential line c0. In this case, the electric potential of the detectors 50 is fixed to that of the constant potential line c0. The detectors 50 in the row of the scanning line turned high are coupled to the respective signal lines $H_1, H_2, \ldots$ and are not coupled to the constant potential line c0. In this case, outputs in touch detection performed by the detectors 50 can be transmitted to the coupling circuit D (e.g., the coupling circuit $D_1$ illustrated in FIG. 9). The outputs in touch detection explained with reference to FIGS. 2 to 4 are transmitted when the coupling state described above is established. It is determined whether to output the outputs of the detectors 50 from the coupling circuit depending on the presence (ON/OFF) of a signal supplied to the open-close signal lines ASW1, ASW2, and ASW3.

The coupling circuit $D_1$ includes the switch circuits S1 to S3 coupled to the respective signal lines $H_1, H_2, \ldots$. Each of the switch circuits S1 to S3 includes an n-type switch N2 and a p-type switch P2. While only the n-type switch N2 and the p-type switch P2 of the switch circuit S1 out of the switch circuits S1 to S3 in the coupling circuit $D_1$ are provided with the reference numerals in FIG. 9, the other switch circuits S2 and S3 also have the same configuration. The switch circuits S1 to S3 included in one coupling circuit are coupled to the open-close signal lines ASW1, ASW2, and ASW3, respectively. In FIG. 9, the switch circuit S1 coupled to the left signal line $H_1$ operates depending on the presence (ON/OFF) of a signal supplied to the open-close signal line ASW1. The switch circuit S2 coupled to the center signal line $H_2$ operates depending on the presence (ON/OFF) of a signal supplied to the open-close signal line ASW2. The switch circuit S3 coupled to the right signal line $H_3$ operates depending on the presence (ON/OFF) of a signal supplied to the open-close signal line ASW3. Similarly, the other coupling circuits $D_2, \ldots,$ and $D_r$ illustrated in FIG. 8 also have a plurality of (e.g., three) switch circuits each of which includes a pair of the n-type switch N2 and the p-type switch P2, operates depending on the presence (ON/OFF) of a signal supplied to the corresponding open-close signal line, and is coupled to the corresponding signal line.

When a signal is output (ON) to the open-close signal line, the n-type switch N2 of the switch circuit coupled to the open-close signal line couples the corresponding integration line on the output side of the coupling circuit $D_1$ to the signal line coupled to the switch circuit. In this case, the outputs from the detectors 50 are transmitted via the signal line and the coupling circuit $D_1$. When a signal is not output (OFF) to the open-close signal line, the p-type switch P2 of the switch circuit coupled to the open-close signal line couples the constant potential line c0 and the signal line. In this case, the outputs from the detectors 50 coupled to the signal line are not transmitted.

While FIG. 9 illustrates only the coupling circuit $D_1$, the other coupling circuits $D_2, \ldots,$ and $D_r$ also have the same configuration. While the coupling circuits $D_1, D_2, \ldots,$ and $D_r$ according to the present embodiment share the open-close signal lines ASW1, ASW2, and ASW3 and operate at the same time, the coupling circuits $D_1, D_2, \ldots,$ and $D_r$ may be individually controlled. The circuit illustrated in FIG. 9 is given by way of example only. The present invention is not limited thereto, and the configuration of each circuit may be appropriately changed.

The control circuit 65 outputs signals to the open-close signal lines ASW1, ASW2, and ASW3. In other words, the control circuit 65 according to the present embodiment controls the coupling circuits $D_1, D_2, \ldots,$ and $D_r$. More specifically, the control circuit 65 controls the output timings of the synchronization signal (CKV) and the start pulse (STARTP) to the driver 60 and the output timings of the signals to the open-close signal lines ASW1, ASW2, and ASW3. The control circuit 65 thus controls the operation timing of the driver 60 and the operation timing of the coupling circuits $D_1, D_2, \ldots,$ and $D_r$ in the selector 70.

Figure 10:
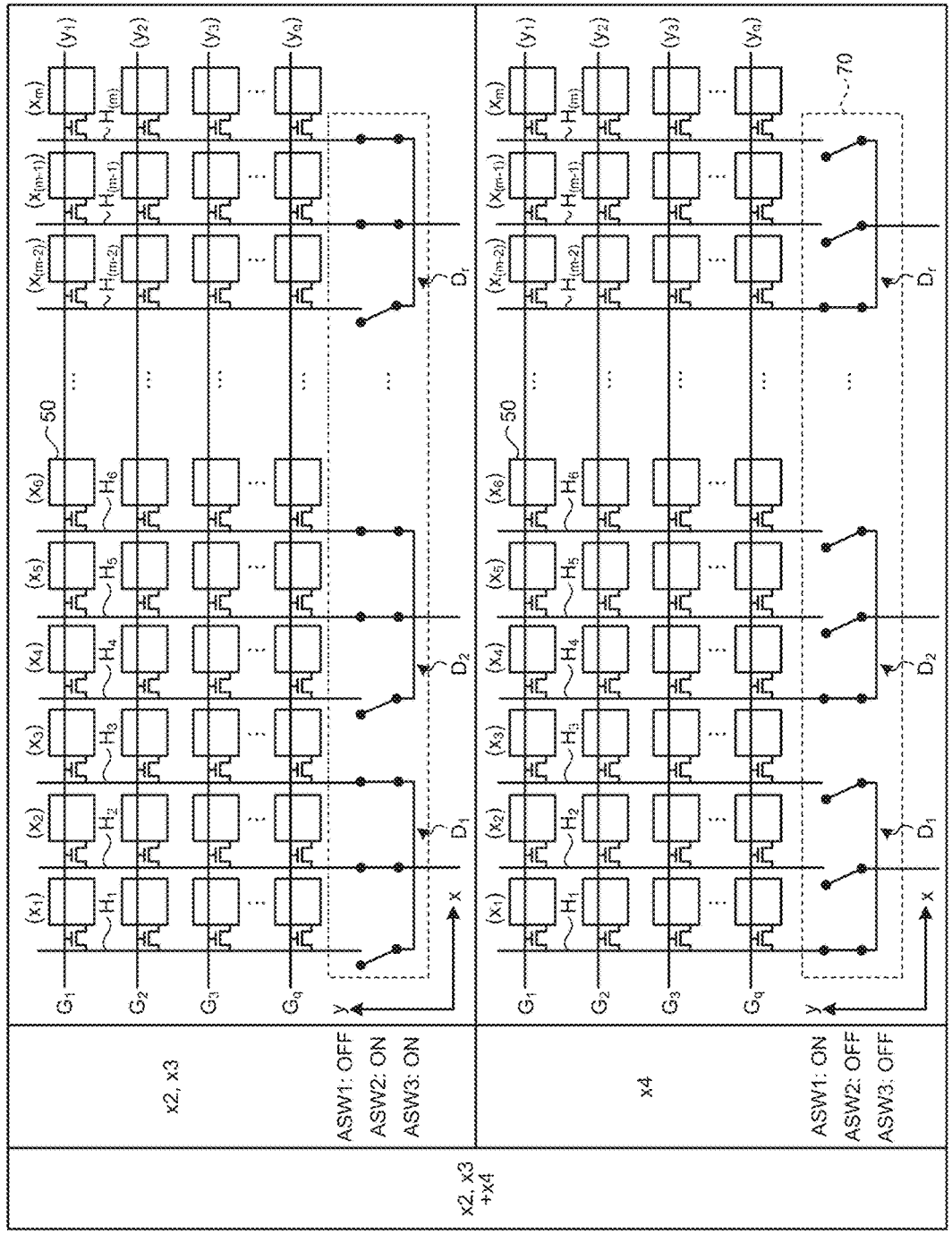
FIG. 10 is a diagram of an example of an integration pattern of outputs from the detectors to be integrated by the selector.
Figure 11:
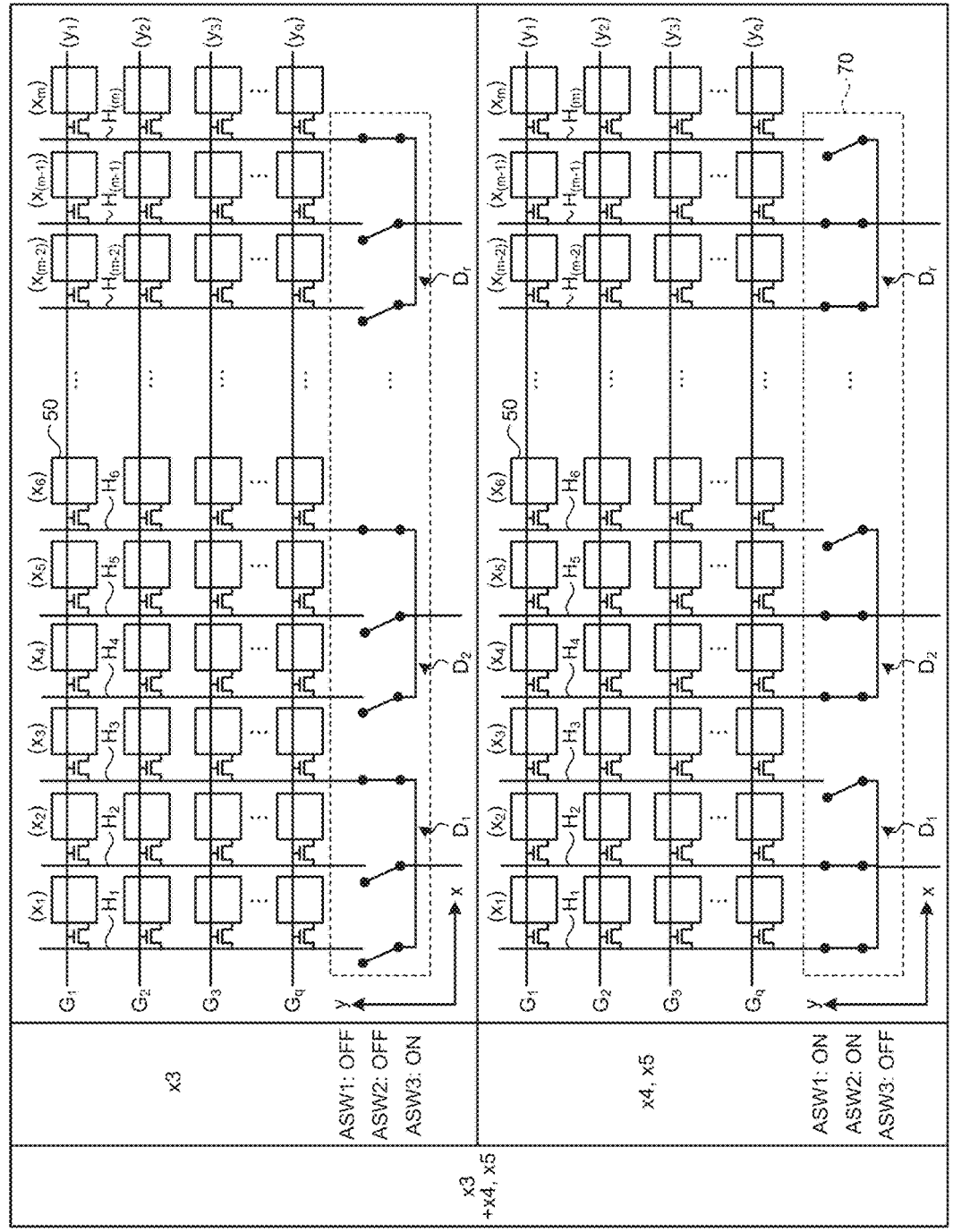
FIG. 11 is a diagram of another example of an integration pattern of outputs from the detectors to be integrated by the selector.

FIGS. 10 and 11 are diagrams of an example of an integration pattern of outputs from the detectors 50 to be integrated by the selector 70. In the example illustrated in FIGS. 8 to 11, the coupling circuit $D_1$ is coupled to the detectors 50 positioned at the coordinates $x_1$, $x_2$, and $x_3$, and the coupling circuit $D_2$ is coupled to the detectors 50 positioned at the coordinates $x_4$, $x_5$, and $x_6$. The same configuration is consecutively arranged in the x-direction, and the coupling circuit $D_r$ is coupled to the detectors 50 positioned at the coordinates $x_{(m-2)}$, $x_{(m-1)}$, and $x_m$.

As illustrated in FIG. 8, the coupling circuit $D_1$ is coupled to the signal lines $H_1$, $H_2$, and $H_3$. With this configuration, the coupling circuit $D_1$ can combine outputs from the detectors 50 positioned at the coordinates $x_1$, $x_2$, and $x_3$ and serving as one group. Similarly, the coupling circuit $D_2$ can combine outputs from the detectors 50 positioned at the coordinates $x_4$, $x_5$, and $x_6$ and serving as one group. Similarly, the coupling circuit $D_r$ can combine outputs from the detectors 50 positioned at the coordinates $x_{(m-2)}$, $x_{(m-1)}$, and $x_m$ and serving as one group.

The selector 70 combines the respective outputs from the coupling circuits $D_1, D_2, \ldots,$ and $D_r$, thereby optionally selecting the detectors 50 to be handled as a single group out of the detectors 50 aligned in the x-direction. For, example, to handle the detectors 50 positioned at the coordinates $x_1$, $x_2$, and $x_3$ as one group, the control circuit 65 turns on all the open-close signal lines ASW1, ASW2, and ASW3 illustrated in FIG. 9, thereby handling the outputs from the detectors 50 coupled to the coupling circuit $D_1$ as one group. As another example, to handle the detectors 50 positioned at the coordinates $x_2$, $x_3$, and $x_4$ as one group, the touch detecting apparatus handles a first output and a second output as one group, the first output being obtained when the integration line $ITL_1$ on the output side of the coupling circuit $D_1$ is coupled to the detectors 50 positioned at the coordinates $x_2$ and $x_3$, and the second output being obtained when the integration line $ITL_2$ on the output side of the coupling circuit $D_2$ is coupled to the detector 50 positioned at the coordinate $x_4$ as illustrated in FIG. 10. In this case, the touch detecting apparatus performs the following first and second processes. In the first process, the control circuit 65 turns on the open-close signal lines ASW2 and ASW3 and turns off the open-close signal line ASW1. The touch detecting apparatus thus obtains the first output from the coupling circuit $D_1$ when the integration line $ITL_1$ is coupled to the detectors 50 positioned at the coordinates $x_2$ and $x_3$. In the second process, the control circuit 65 turns off the open-close signal lines ASW2 and ASW3 and turns on the open-close signal line ASW1. The touch detecting apparatus thus obtains the second output from the coupling circuit $D_2$ when the integration line $ITL_2$ is coupled to the detectors 50 positioned at the coordinate $x_4$. As still another example, to handle the detectors 50 positioned at the coordinates $x_3$, $x_4$, and $x_5$ as one group, the touch detecting apparatus handles a first output and a second output as one group, the first output being obtained when the integration line $ITL_1$ on the output side of the coupling circuit $D_1$ is coupled to the detector 50 positioned at the coordinate $x_3$ and a second output obtained when the integration line $ITL_2$ on the output side of the coupling circuit $D_2$ is coupled to the detectors 50 positioned at the coordinates $x_4$ and $x_5$ as illustrated in FIG. 11. In this case, the touch detecting apparatus performs the following first and second processes. In the first process, the control circuit 65 turns on the open-close signal line ASW3 and turns off the open-close signal lines ASW1 and ASW2. The touch detecting apparatus thus obtains the first output from the coupling circuit $D_1$ when the integration line $ITL_1$ is coupled to the detector 50 positioned at the coordinate $x_3$. In the second process, the control circuit 65 turns off the open-close signal line ASW3 and turns on the open-close signal lines ASW1 and ASW2. The touch detecting apparatus thus obtains the second output from the coupling circuit $D_2$ when the integration line $ITL_2$ is coupled to the detectors 50 positioned at the coordinates $x_4$ and $x_5$. As described above, each coupling circuit can change the combination patterns of the detectors 50 the outputs of which are transmitted depending on the presence (ON/OFF) of a signal supplied to the open-close signal lines ASW1, ASW2, and ASW3. The touch detecting apparatus thus can switch between a first mode to handle the detectors 50 positioned at the coordinates $x_1$, $x_2$, and $x_3$ as one group, a second mode to handle the detectors 50 positioned at the coordinates $x_2$, $x_3$, and $x_4$ as one group, and a third mode to handle the detectors 50 positioned at the coordinates $x_3$, $x_4$, and $x_5$ as one group. While the explanation has been made of the coupling circuits $D_1$ and $D_2$, for example, the touch detecting apparatus can switch the coupling states of adjacent coupling circuits in the same manner. The touch detecting apparatus thus can optionally combine a plurality of (e.g., three) detectors 50 consecutively aligned in the x-direction. The groups of the detectors 50 described above are given by way of example only. The present invention is not limited thereto, and the groups may be appropriately changed.

Figure 12:
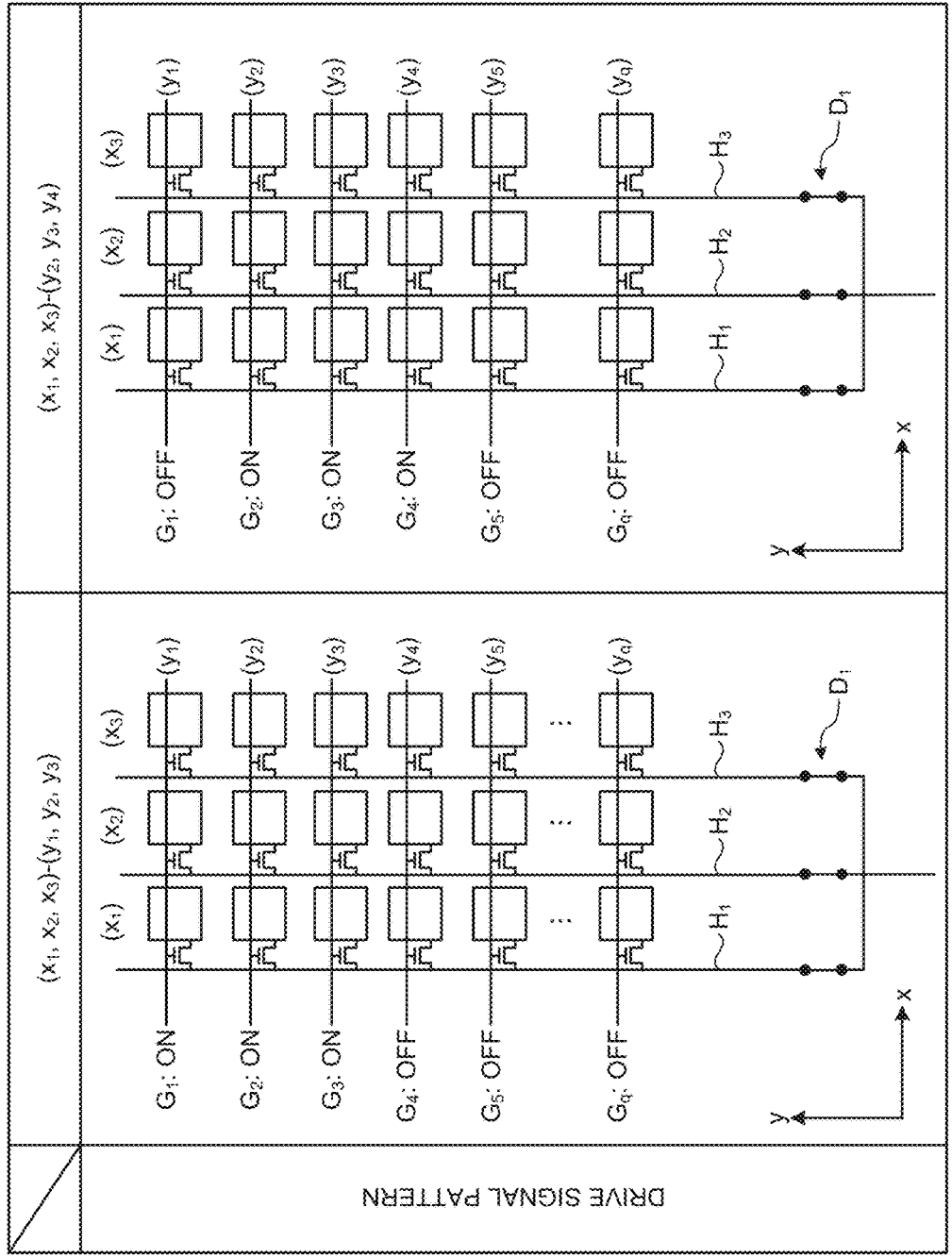
FIG. 12 is a diagram of an example of the relation of coupling between scanning lines to which the drive signal is output and the selector.

FIG. 12 is a diagram of an example of the relation of coupling between the scanning lines to which the drive signal is output and the selector 70. A case is assumed where the drive signal is supplied to the scanning lines $G_1$, $G_2$, and $G_3$ in a state where the touch detecting apparatus can obtain, from the coupling circuit $D_1$, an integrated output of the detectors 50 positioned at the coordinates $x_1$, $x_2$, and $x_3$ and serving as one group, for example. In this case, the touch detecting apparatus can handle the nine detectors 50 positioned at the coordinates $x_1$, $x_2$, and $x_3$ in the x-direction and the coordinates $y_1$, $y_2$, and $y_3$ in the y-direction as one group and integrate the outputs (Vdet2) from the detectors 50 included in the group. A case is assumed where the drive signal is supplied to the scanning lines $G_2$, $G_3$, and $G_4$ in a state where the touch detecting apparatus can obtain an integrated output of the detectors 50 positioned at the coordinates $x_1$, $x_2$, and $x_3$ and serving as one group, for example. In this case, the touch detecting apparatus can handle the nine detectors 50 positioned at the coordinates $x_1$, $x_2$, and $x_3$ in the x-direction and the coordinates $y_2$, $y_3$, and $y_4$ in the y-direction as one group. This mechanism is also applied to the relation between the outputs and the scanning lines $G_5, \ldots,$ and $G_q$ subsequent to the scanning line $G_4$. As described above, by combining scanning lines to which the drive signal is output at the same time out of the scanning lines $G_1, G_2, \ldots,$ and $G_q$, the touch detecting apparatus can optionally determine the combination of the detectors 50 serving as a single group in the y-direction. In other words, by combining the detectors 50 by the selector 70 (refer to FIGS. 8 to 11) and combining the scanning lines to which the drive signal is output at the same time (refer to FIG. 12) out of the scanning lines $G_1, G_2, \ldots,$ and $G_q$, the touch detecting apparatus can optionally select the detectors 50 serving as a single group in the x- and y-directions. Consequently, the driver 60 and the selector 70 serve as a selecting device that can individually switch, in the two directions, the combinations of the detectors 50 the outputs of which are integrated, that is, the combinations of the detectors 50 serving as a single group.

In this embodiment, it is possible to change optionally the relation between the switching timing of the scanning lines $G_1, G_2, \ldots,$ and $G_q$ to be a target to which the drive signal is output and the switching timing of the switch circuits S1, S2, and S3 that couple and decouple the integration lines $ITL_1, ITL_2, \ldots, ITL_r$ to and from the signal lines $H_1, H_2, \ldots,$ and $H_m$. The touch detecting apparatus, for example, may change the state of each switch circuit S1, S2, and S3 while maintaining the combination of the scanning lines $G_1, G_2, \ldots,$ and $G_q$ to be a target to which the drive signal is output. In this case, for example, the touch detecting apparatus sequentially switches the combinations of the detectors 50 serving as a single group in the x-direction while maintaining the output of the drive signal to the scanning lines $G_1, G_2,$ and $G_3$. Specifically, in the coupling circuits $D_1$ and $D_2$, the touch detecting apparatus sequentially change the combination of the detectors 50 by: coupling the integration lines $ITL_1$ and $ITL_2$ on the output sides of the coupling circuits $D_1$ and $D_2$ to the detectors 50 positioned at the coordinates $x_1$ to $x_6$; coupling the integration line $ITL_1$ on the output side of the coupling circuit $D_1$ to the detectors 50 positioned at the coordinates $x_2$ and $x_3$ and coupling the integration line $ITL_2$ on the output side of the coupling circuit $D_2$ to the detectors 50 positioned at the coordinate $x_4$; and coupling the integration line $ITL_1$ on the output side of the coupling circuit $D_1$ to the detectors 50 positioned at the coordinate $x_3$ and coupling the integration line $ITL_2$ on the output side of the coupling circuit $D_2$ to the detectors 50 positioned at the coordinates $x_4$ and $x_5$, for example. By contrast, the touch detecting apparatus may sequentially switch the combinations of the detectors 50 serving as a single group in the y-direction as follows: the touch detecting apparatus switches the scanning lines to be a target to which the drive signal is output from the scanning lines $G_1, G_2,$ and $G_3$ to the scanning lines $G_2, G_3,$ and $G_4$ while maintaining the state of the switch circuits S1, S2, and S3 that couple and decouple the integration lines $ITL_1, ITL_2, \ldots, ITL_r$ to and from the signal lines $H_1, H_2, \ldots,$ and $H_m$.

Figure 13:
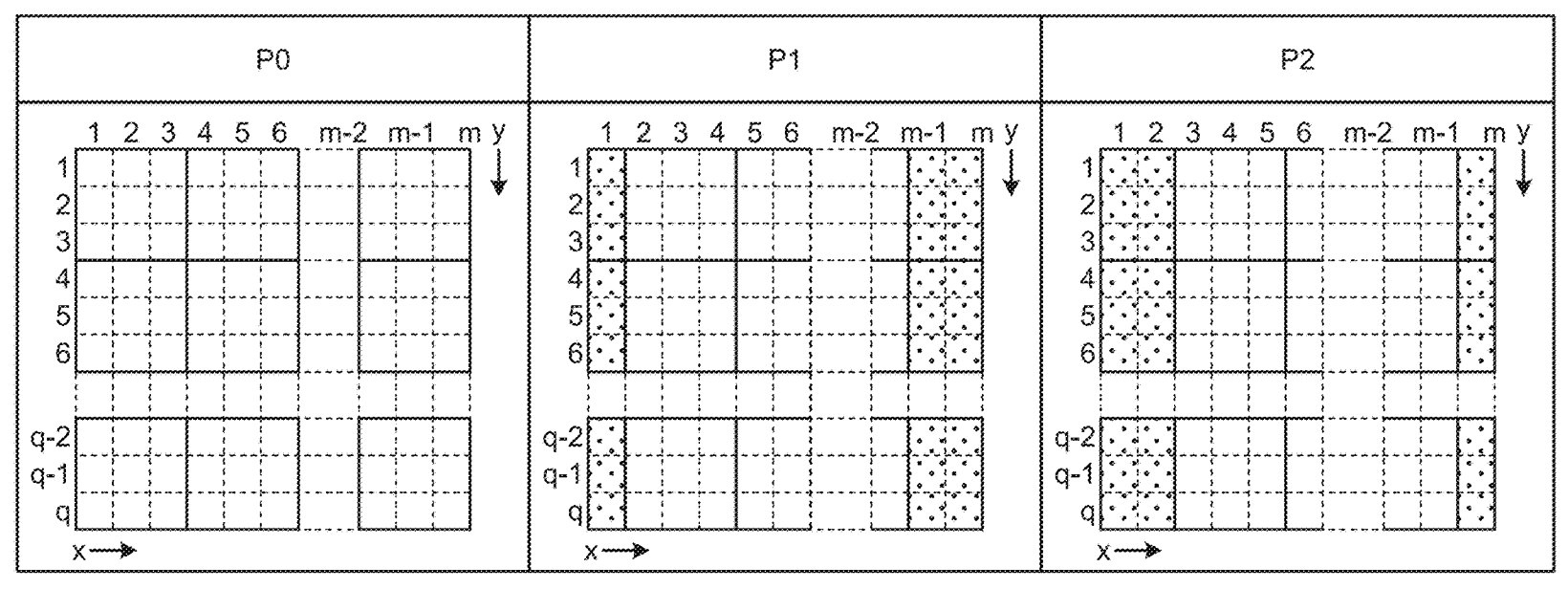
Figure 14:
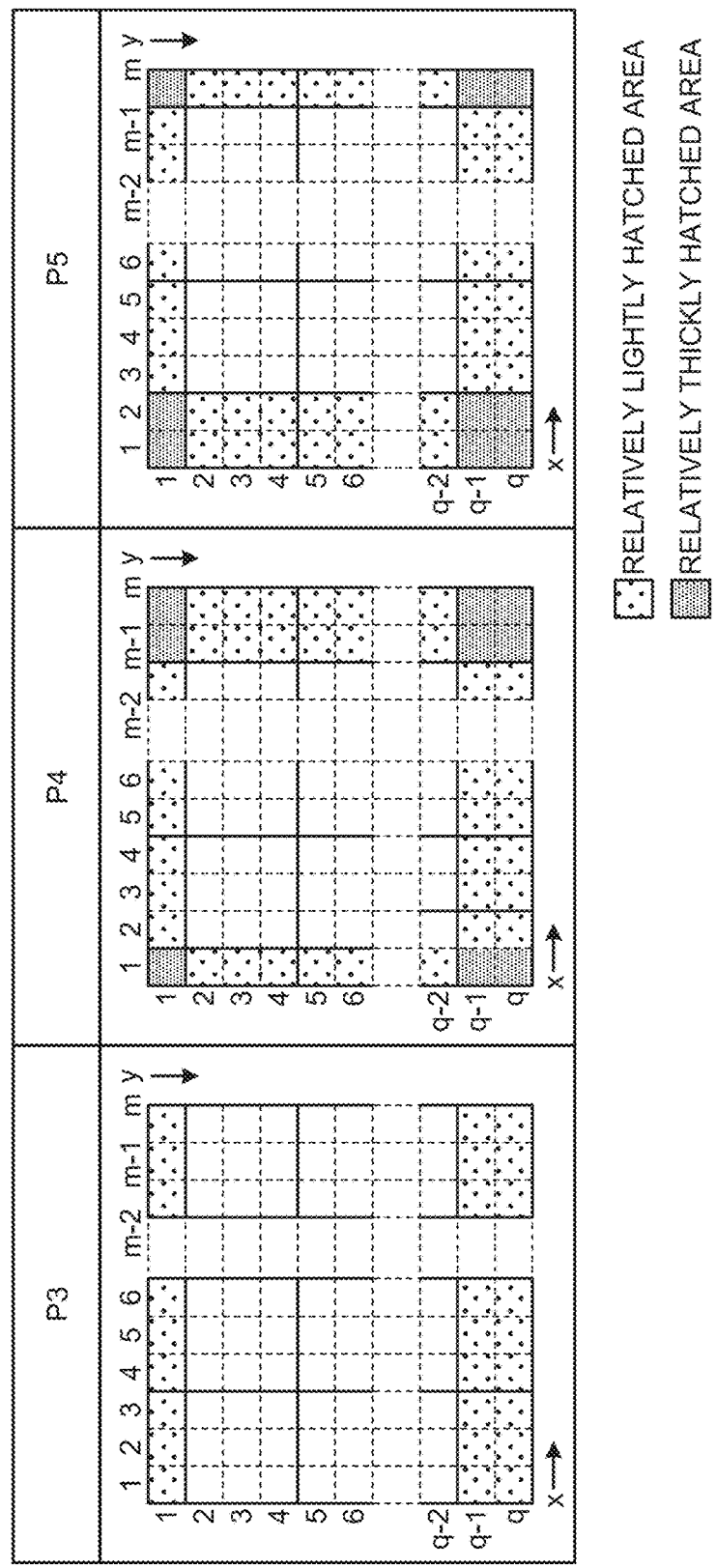
FIG. 14 is a diagram of another example of selection patterns of the detectors to be handled as a single group.
Figure 15:
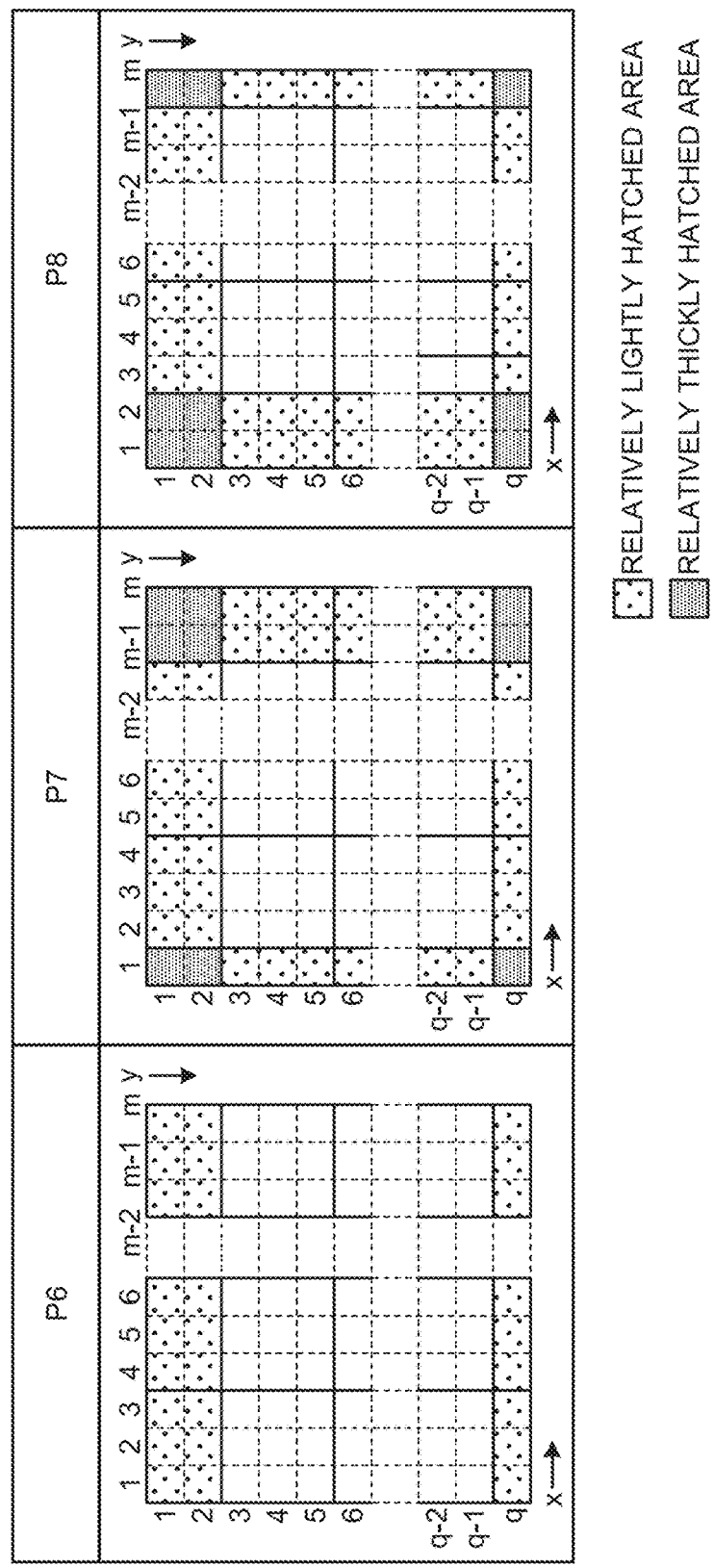
FIG. 15 is a diagram of still another example of selection patterns of the detectors to be handled as a single group.

FIGS. 13 to 15 are diagrams of an example of selection patterns of the detectors 50 to be handled as a single group. Hereinafter, the selection patterns may be simply referred to as patterns in some cases. While 3×3 detectors 50 aligned in the x-direction×the y-direction, respectively, are handled as a single group in the present embodiment, the number of detectors 50 to be handled as the single group in the x- and y-directions and the total number thereof may be optionally predetermined. In FIG. 13 and other figures, a rectangle indicated by solid lines corresponds to the single group, and a rectangle divided by dashed lines in each group corresponds to one detector 50 for the convenience of explanation. In FIGS. 13 to 15, the coordinates in the x-direction and those in the y-direction are represented only by numbers.

In the example illustrated in FIGS. 13 to 15, the number of selection patterns including the detector 50 of $(x_3,y_3)$ is nine in total. Specifically, the selection patterns corresponding to combinations of the coordinates in the x-direction and those in the y-direction of the detectors 50 to be handled as a single group and including the detector 50 of $(x_3,y_3)$ are the following nine patterns: a pattern P0 of $(x_1,x_2,x_3)$-$(y_1,y_2,y_3)$, a pattern P1 of $(x_2,x_3,x_4)$-$(y_1,y_2,y_3)$, and a pattern P2 of $(x_3,x_4,x_5)$-$(y_1,y_2,y_3)$ (refer to FIG. 13); a pattern P3 of $(x_1,x_2,x_3)$-$(y_2,y_3,y_4)$, a pattern P4 of $(x_2,x_3,x_4)$-$(y_2,y_3,y_4)$, and a pattern P5 of $(x_3,x_4,x_5)$-$(y_2,y_3,y_4)$ (refer to FIG. 14); and a pattern P6 of $(x_1,x_2,x_3)$-$(y_3,y_4,y_5)$, a pattern P7 of $(x_2,x_3,x_4)$-$(y_3,y_4,y_5)$, and a pattern P8 of $(x_3,x_4,x_5)$-$(y_3,y_4,y_5)$ (refer to FIG. 15). As described above, in the present embodiment, nine selection patterns including one detector 50 are employed. The number of selection patterns may be appropriately changed within the range of the total number of patterns derived from the number of detectors 50 to be handled as a single group in the x- and y-directions and the total number thereof.

The output (integrated output) obtained by integrating outputs handled as a group in the detection area is assumed to indicate the result of detection in a partial area in which the detectors 50 included in the group are arranged. As described above with reference to FIG. 13, the touch detecting apparatus employs a plurality of (e.g., nine) selection patterns the groupings of which are different from one another, so that the arrangement of partial areas in the detection area is different for each selection pattern. The touch detecting apparatus thus can obtain a plurality of pieces of (e.g., nine) output data corresponding to the respective selection patterns. An integrated output indicates an output obtained by integrating outputs from the detectors 50 in one group. Output data indicates an output corresponding to the entire detection area obtained by performing grouping on all the detectors 50 arranged in the detection area, integrating outputs from the detectors 50 in each group to obtain a plurality of pieces of integrated data of respective groups, and combining the pieces of integrated data. In other words, the combinations of the detectors 50 the outputs of which are integrated (the combinations of the detectors 50 serving as a single group) are different between the patterns. The arrangement of a plurality of detectors 50 the outputs of which are integrated (the arrangement of the detectors 50 serving as a single group) is shifted by a predetermined shift amount between two different patterns. The predetermined shift amount is smaller than the width of a group area in the alignment direction (the x-direction or the y-direction) of the detectors 50, the group area being an area in which the detectors 50 serving as a single group are arranged. The touch detecting apparatus of the present embodiment, for example, handles 3×3 detectors 50 in the x-direction×the y-direction, respectively, as a single group. The number of detectors 50 included in the single group is three in the x-direction and the y-direction. The shift amount of the detectors 50 generated in the nine selection patterns, that is, the shift amount in the arrangement of the detectors 50 serving as the single group corresponds to two detectors 50 at most both in the x-direction and the y-direction.

The integrated output is data obtained by integrating the outputs from a plurality of (e.g., 3×3=9) detectors 50. The output data is rougher than data obtained by individually handling the pieces of data output from the respective detectors 50. In other words, the output data has resolution lower than the detection ability (resolution) corresponding to the number of detectors 50.

The driver 60 and the selector 70 are circuits directly mounted on the TFT layer 110, for example. This is given as an example of a specific configuration of the driver 60 and the selector 70, and the present invention is not limited thereto. At least one of the driver 60 and the selector 70 may be provided as a driver integrated circuit (IC) and attached to wiring on the substrate 105.

The A/D converter 80 converts analog data output from the selector 70 into digital data and outputs it to the arithmetic processing circuit 90.

The arithmetic processing circuit 90 uses a plurality of pieces of (e.g., nine) output data to derive detection results of the respective detectors 50. In other words, the arithmetic processing circuit 90 combines the derived detection results of the respective detectors 50, thereby reconstructing the touch detection result in the entire detection area. The resolution of the touch detection result obtained by the reconstruction corresponds to the number of detectors 50.

The A/D converter 80 and the arithmetic processing circuit 90 are driver ICs mounted on a flexible printed circuit board 85 attached to wiring on the substrate 105, for example. This is given as an example of a specific configuration that provides the functions of the A/D converter 80 and the arithmetic processing circuit 90, and the present invention is not limited thereto. The A/D converter 80 and the arithmetic processing circuit 90 may be attached to wiring on the substrate 105, for example. Part or all of the functions of the A/D converter 80 and the arithmetic processing circuit 90 may be functions of an external circuit (e.g., a graphics processing unit (GPU)), such as the flexible printed circuit board 85, coupled to the output side of the selector 70 via wiring. In this case, the touch detecting apparatus is not provided with the A/D converter 80 or the arithmetic processing circuit 90 and includes the selector 70 as its output terminal. The touch detecting apparatus and the external circuit constitute a touch detection system.

Figure 16:
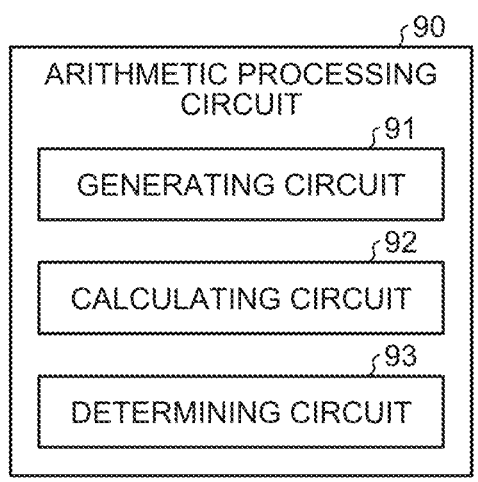
FIG. 16 is a block diagram of an example of a functional configuration of an arithmetic processing circuit.

FIG. 16 is a block diagram of an example of the functional configuration of the arithmetic processing circuit 90. The arithmetic processing circuit 90 functions as a generating circuit 91, a calculating circuit 92, and a determining circuit 93, for example.

The generating circuit 91 performs generation for generating a plurality of pieces of output data corresponding to a plurality of patterns and having resolution lower than the resolution corresponding to the number of detectors 50 based on outputs from the detectors 50. Specifically, the generating circuit 91 combines outputs from the coupling circuits $D_1, D_2, \ldots,$ and $D_r$, thereby generating output data corresponding to the entire detection area. More specifically, in a case where an output from one coupling circuit corresponds to an output from one group, the generating circuit 91 combines respective pieces of digital data corresponding to the integrated outputs from the coupling circuits $D_1, D_2, \ldots,$ and $D_r$ without any change, thereby generating output data. By contrast, in a case where an output from one coupling circuit does not correspond to an output from one group (refer to FIGS. 10 and 11), the generating circuit 91 combines respective pieces of digital data corresponding to the integrated outputs from a plurality of coupling circuits (e.g., outputs from the coupling circuits $D_1$ and $D_2$), thereby generating pieces of digital data of integrated outputs (integrated data) corresponding to the respective groups. The generating circuit 91 combines the pieces of integrated data, thereby generating output data.

Figure 17:
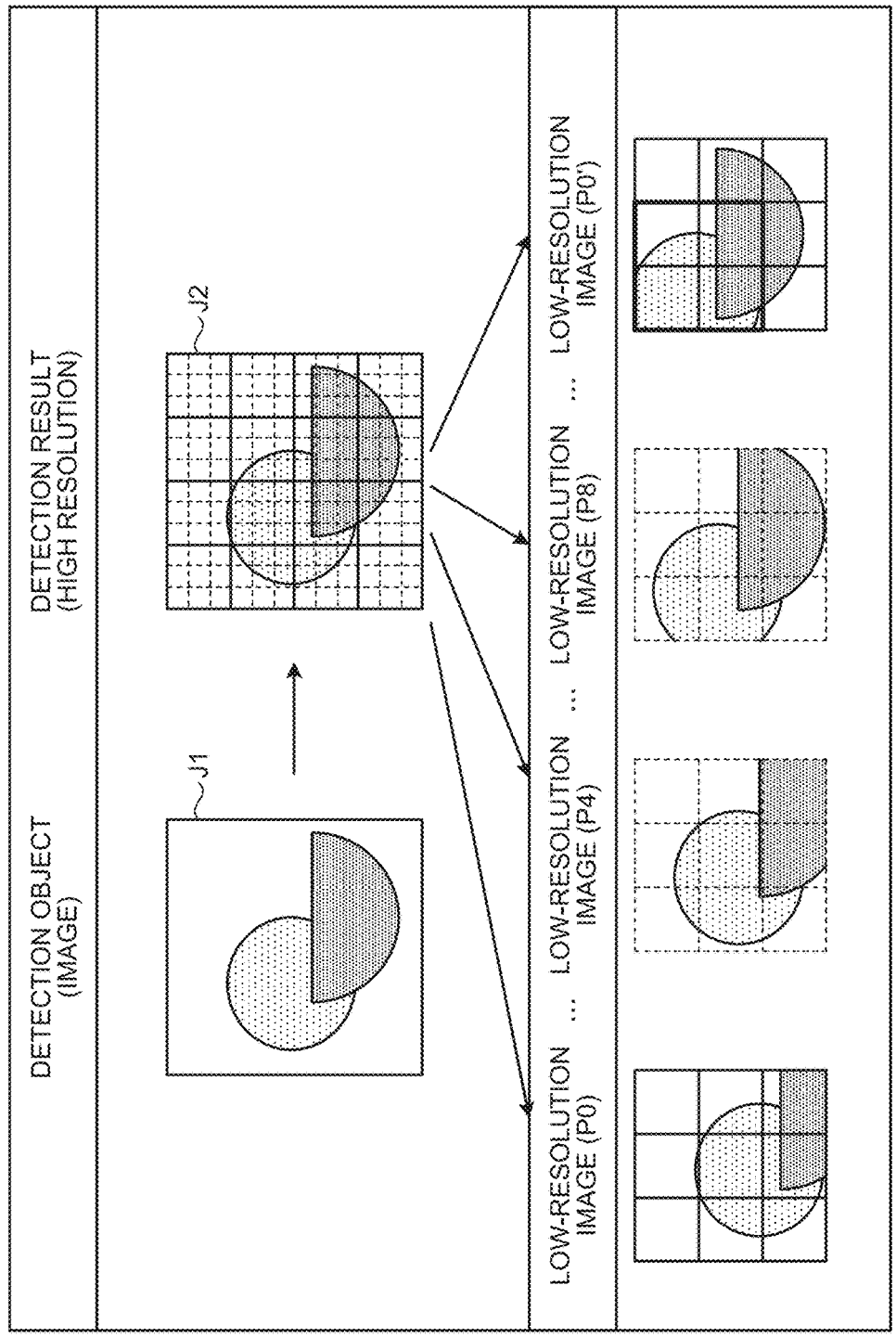
FIG. 17 is an image diagram of an integrated output generated by a generating unit.

FIG. 17 is an image diagram of an integrated output generated by the generating circuit 91. A case is assumed where an image J1 indicates a detection object detected in the detection area provided with 12×12 detectors 50, for example. In this case, 12×12 detection results correspond to the respective 12×12 rectangular areas divided by the solid lines and the dashed lines in an image J2 having high resolution as a "detection result". In the image J2, to simplify the explanation, the lines dividing the entire detection area into a plurality of first areas are indicated by the solid lines, and the lines further dividing each first area into a plurality of second areas are indicated by the dashed lines. Each first area corresponds 3×3 detectors 50. Each second area corresponds to one detector 50. The generating circuit 91 integrates the detection results of the respective detectors 50 illustrated in the image J2, thereby generating output data corresponding to patterns P0 to P8 as low-resolution images. The low-resolution images are generated based on the integrated outputs from the coupling circuits $D_1, D_2, \ldots,$ and $D_r$, so that the detection results of the respective detectors 50 are not held individually. As a result, the detection result of the area obtained by integrating outputs from 3×3 detectors is represented as an output (an output of one first area). While the low-resolution images illustrated in FIG. 17 maintain the original image of the detection object, the actual low-resolution images are data indicating the average obtained by integrating the outputs from the 3×3 detectors 50 (refer to FIGS. 20 and 21). To simplify the explanation, FIG. 17 illustrates images generated in units of 9×9 detection areas. As a result, an area of the leftmost low-resolution image (P0) overlaps with the rightmost low-resolution image (P0'). Specifically, the area surrounded by the thick solid lines in the rightmost low-resolution image (P0') is the overlapping area. In actual generation, such an overlapping area is generated only once in the integrated output image based on the detection results obtained at the same time, and overlapping generation thereof is omitted. If the integrated output image is generated based on the detection results obtained at different timings, the overlapping area may be generated again. The pattern P0' is a variation of the pattern P0 illustrated in FIG. 13.

Figure 18:
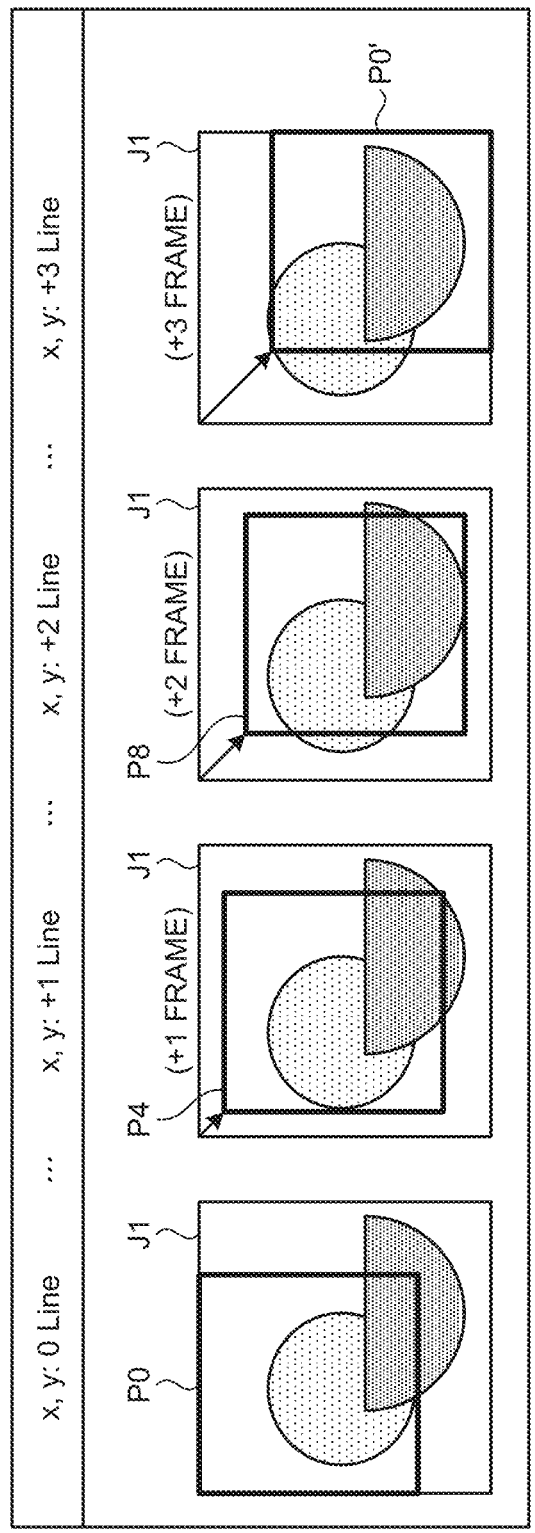
FIG. 18 is an image diagram schematically illustrating the positional relation between respective areas of low-resolution images illustrated in FIG. 17.

FIG. 18 is an image diagram schematically illustrating the positional relation between the respective areas of the low-resolution images illustrated in FIG. 17. As described above with reference to FIG. 7, for example, a case is assumed where the touch detecting apparatus performs three-row shift. In this case, the touch detecting apparatus performs processing of generating the low-resolution frame data illustrated in the upper part (0Line) of FIG. 7 and then performs processing of shifting the start line of three-row shift by one line and generating the low-resolution frame data of the middle part (1Line). If the low-resolution image (y: 0Line) of the pattern P0 illustrated in FIG. 18 is obtained as the first low-resolution frame data, the low-resolution image (y: +1Line) of the pattern P4 is obtained as the second low-resolution frame data. Subsequently, the low-resolution image (y: +2Line) of the pattern P8 is obtained as the third low-resolution frame data, and the low-resolution image (y: +3Line) of the pattern P0' is obtained as the fourth low-resolution frame data. Similarly to this, low-resolution images are obtained by shifting the start line by +1Line in the y-direction. While FIG. 18 illustrates the low-resolution images obtained by shifting the start line by +1Line also in the x-direction to simplify the explanation, the shift amount in the x-direction is not necessarily the same as that in the y-direction. The shift amounts may be independently determined.

If, in generation of a piece of integrated data, a smaller number of detectors 50 than the number of detectors 50 included in a single group remain in both end areas in the alignment direction of the detectors 50 without being included in any group, the generating circuit 91 according to the present embodiment combines the detectors 50 included in the both end areas to be set into one group. The both end areas are areas sandwiching an area in which the detectors 50 included in at least one group are arranged. In other words, if a smaller number of detectors 50 than the number of detectors 50 included in a single group are positioned in the both end areas in the alignment direction of the detectors 50, the outputs from the detectors 50 included in the both end areas are integrated, such that the number of the detectors 50 in the both end areas that are combined as one group is equal to the number of the detectors 50 in one group arranged between the both end areas.

Specifically, as indicated by the hatched detectors 50 out of the detectors 50 positioned at the coordinates $x_1, x_{(m-1)}$, and $x_m$ in the pattern P1 (refer to FIG. 13), for example, the generating circuit 91 combines the detectors 50 of less than three columns positioned in both end areas in the x-direction, thereby selecting the detectors 50 of three columns to be handled as one group. The generating circuit 91 also selects the detectors 50 relatively lightly hatched in the patterns P4 and P7 (refer to FIGS. 14 and 15, respectively) in the same manner. The generating circuit 91 also selects the detectors 50 relatively lightly hatched out of the detectors 50 positioned at the coordinates $x_1$, $x_2$, and $x_m$ in the patterns P2, P5, and P8 in the same manner. As indicated by the hatched detectors 50 out of the detectors 50 positioned at the coordinates $y_1$, $y_{(q-1)}$, and $y_q$ in the pattern P3 (refer to FIG. 14), for example, the generating circuit 91 combines the detectors 50 of less than three rows positioned in the both end areas in the y-direction, thereby selecting the detectors 50 of three rows to be handled as one group. The generating circuit 91 also selects the detectors 50 relatively lightly hatched in the patterns P4 and P5 in the same manner. The generating circuit 91 also selects the detectors 50 relatively lightly hatched out of the detectors 50 positioned at the coordinates $y_1$, $y_2$, and $y_q$ in the patterns P6, P7, and P8 (refer to FIG. 15) in the same manner. The generating unit combines the nine detectors 50 relatively thickly hatched out of the detectors 50 positioned at the coordinates $(x_1, x_{(m-1)}, x_m)$-$(y_1, y_{(q-1)}, y_q)$ in the pattern P4 (refer to FIG. 14), for example, thereby selecting 3×3 detectors 50 serving as one group. The generating circuit 91 also selects the nine detectors 50 relatively thickly hatched in the patterns P5, P7, and P8 in the same manner. As a result, the number of groups including the detectors 50 positioned near the ends of the detection area is made equivalent to the number of groups including the detectors 50 positioned at the inner part of the detection area. Consequently, in the present embodiment, it is possible to prevent reduction in the integrated data associated with the detectors near the ends, thereby increasing the accuracy in the entire detection area.

In the examples of the combinations indicated by hatching in FIGS. 13 to 15, 3×3 detectors 50 are handled as a single group. The generating circuit 91 appropriately determines the number of rows and columns to be combined in both end areas based on the number and the arrangement of the detectors 50 serving as a single group.

The calculating circuit 92 performs calculation for calculating, for each detector 50, a composite value to be used to derive the detection result of each of the detectors 50 based on the pieces of output data corresponding to the plurality of patterns. Specifically, the calculating circuit 92 calculates the composite value of the detection result of each detector 50 based on the following super-resolution processing formula (Expression (1)). In Expression (1), N is the number of patterns for output data having resolution lower than the detection ability (resolution) corresponding to the number of detectors 50. In the present embodiment, N=9 is satisfied. k is an integer of 0, 1, . . . , and N−1 and corresponds to the patterns for the output data (refer to the patterns P0 to P8 in FIGS. 13 to 15, for example). $Y_k$ is output data corresponding to a pattern Pk. $X_n$ is a composite value obtained by performing n calculations of Expression (1). $X_0$ is an initial value obtained before calculation of Expression (1). β is a calculation step coefficient that is larger than 0 and smaller than 1 (0<β<1) and adjusted such that the value in the curly brackets by which β is multiplied does not exceed $X_n$. $A_k$ is a degradation function (which will be described later). $A^T$ is a transposed matrix of a matrix A. If the matrix A is expressed by Expression (2), the matrix $A^T$ is expressed by Expression (3). α is a weighting coefficient having a certain value larger than 0 (0<α). α is preferably smaller than N (α<N). $E'(X_n)$ is a function indicating a correction condition for data and is a derivative of $E(X_n)$. Specifically, to emphasize the edge of unevenness of the detected object in reconstruction of the touch detection results in the entire detection area obtained based on the output data, for example, E(X) is expressed by Expression (4). T in Expression (4) is a Laplacian filter and is expressed by Expression (5) when N=9 is satisfied, for example. If correction, such as emphasis of the edge, is not required, E(X) is 0. A specific expression of a derivative E'(X) is expressed by Expressions (6) and (7), for example. X indicates image data. While X is generally expressed by a two-dimensional array, it may be rearranged into a one-dimensional array. In this case, calculation can be simplified. In a case where X is rearranged into a one-dimensional array, image data can be obtained by the Raster scanning method of deriving a data array in a first direction (e.g., the row direction) as X and consecutively coupling the derived X in a second direction (e.g., the column direction), for example. i in Expression (7) is an integer of 0, 1, . . . , and N−1.

$$X_{n+1} = X - \beta \left\{ \sum_{K=0}^{N-1} A_K^T (A_K X_n - Y_K) + \alpha E'(X_n) \right\} \quad (1)$$

$$A = \begin{pmatrix} 1 & 2 & 3 \\ 4 & 5 & 6 \\ 7 & 8 & 9 \end{pmatrix} \quad (2)$$

$$A^T = \begin{pmatrix} 1 & 4 & 7 \\ 2 & 5 & 8 \\ 3 & 6 & 9 \end{pmatrix} \quad (3)$$

$$E(X) = \|\Gamma X\| \quad (4)$$

$$\Gamma = \begin{Bmatrix} -1 & -1 & -1 \\ -1 & 8 & -1 \\ -1 & -1 & -1 \end{Bmatrix} \quad (5)$$

$$E'(X) = \begin{pmatrix} \frac{\partial}{\partial X_0} E(X) \\ \frac{\partial}{\partial X_1} E(X) \\ \vdots \\ \frac{\partial}{\partial X_i} E(X) \\ \vdots \\ \frac{\partial}{\partial X_{N-1}} E(X) \end{pmatrix} \quad (6)$$

$$\frac{\partial}{\partial X_i} \|\Gamma X\| = \frac{X_i \sum_{j=0}^{N-1} \Gamma_{ij}^2}{\|\Gamma X\|} \quad (7)$$

FIG. 19 is a schematic diagram illustrating the relation between a plurality of pieces of integrated data including outputs from the detectors 50 and values obtained by combining the pieces of integrated data. FIG. 20 is a diagram of a schematic example visually representing the relation between the pieces of integrated data and the values obtained by combining the pieces of integrated data illustrated in FIG. 19. FIG. 21 is a diagram schematically illustrating processing for generating high-resolution data by combining low-resolution data. The degradation function ($A_k$) is an operator that shifts actual data to convert it into a low-resolution frame. Specifically, $A_k$ indicates an arithmetic operation result obtained by performing an averaging operation of bundling a plurality of pieces of integrated data and an operation of reduction in data by causing the data to have lower resolution. In FIG. 19, for example, the integration result of outputs of 3×3=9 detectors 50 of A0, A1, . . . , and A8 are handled as an integrated output A'. Similarly, the integration result of outputs of B0, B1, . . . , and B8 are handled as an integrated output B', and the integration result of outputs of C0, C1, . . . , and C8 are handled as an integrated output C'. This rule is also applied to the other alphabets (D to I) in FIG. 19. In a case where 3×3 pixel areas are handled as an area corresponding to a piece of integrated data as illustrated in FIG. 19, the resolution of the low-resolution frame indicated by the degradation function ($A_k$) is one-third in the row direction and one-third in the column direction of the resolution of the array of the detectors 50 prior to degradation, that is, prior to integration. The touch detecting apparatus obtains data of the low-resolution frame indicated by the degradation function ($A_k$) for each pattern (e.g., the patterns P1 to P8 illustrated in FIGS. 13 and 14). The touch detecting apparatus can obtain the detection result of one detector 50 from the combination of data of the low-resolution frames corresponding to the selection patterns the integrated output of which includes the output of the detector 50. The selection patterns including the detector 50 of ($x_3,y_3$) are the following nine patterns: the pattern P0 of ($x_1,x_2,x_3$)-($y_1,y_2,y_3$), the pattern P1 of ($x_2,x_3,x_4$)-($y_1,y_2,y_3$), and the pattern P2 of ($x_3,x_4,x_5$)-($y_1,y_2,y_3$) (refer to FIG. 13); the pattern P3 of ($x_1,x_2,x_3$)-($y_2,y_3,y_4$), the pattern P4 of ($x_2,x_3,x_4$)-($y_2,y_3,y_4$), and the pattern P5 of ($x_3,x_4,x_5$)-($y_2,y_3,y_4$) (refer to FIG. 14); and the pattern P6 of ($x_1,x_2,x_3$)-($y_3,y_4,y_5$), the pattern P7 of ($x_2,x_3,x_4$)-($y_3,y_4,y_5$), and the pattern P8 of ($x_3,x_4,x_5$)-($y_3,y_4,y_5$) (refer to FIG. 15). The touch detecting apparatus can obtain the detection result of the detector 50 ($x_3,y_3$) from the data of the low-resolution frames corresponding to the respective patterns. As illustrated in FIG. 20, for example, if all the patterns have the lowest detection result (no detection), the detection result obtained from the combination of the patterns is the lowest detection result (no detection). By contrast, if all the patterns have the highest detection result, the detection result obtained from the combination of the patterns is the highest detection result. If the detection results are different between the patterns, the detection result obtained from the combination of the patterns is a value obtained by combining (e.g., averaging) the detection results of the respective patterns. While the lowest detection result in FIG. 20 is represented by white, the highest detection result is represented by black, and the intermediate detection result is represented by gray, this is given by way of schematic example only. The calculating circuit 92 performs calculation based on the mechanism described with reference to FIGS. 19 to 21 using the algorithm expressed by Expression (1) and expressions relating thereto.

Figure 22:
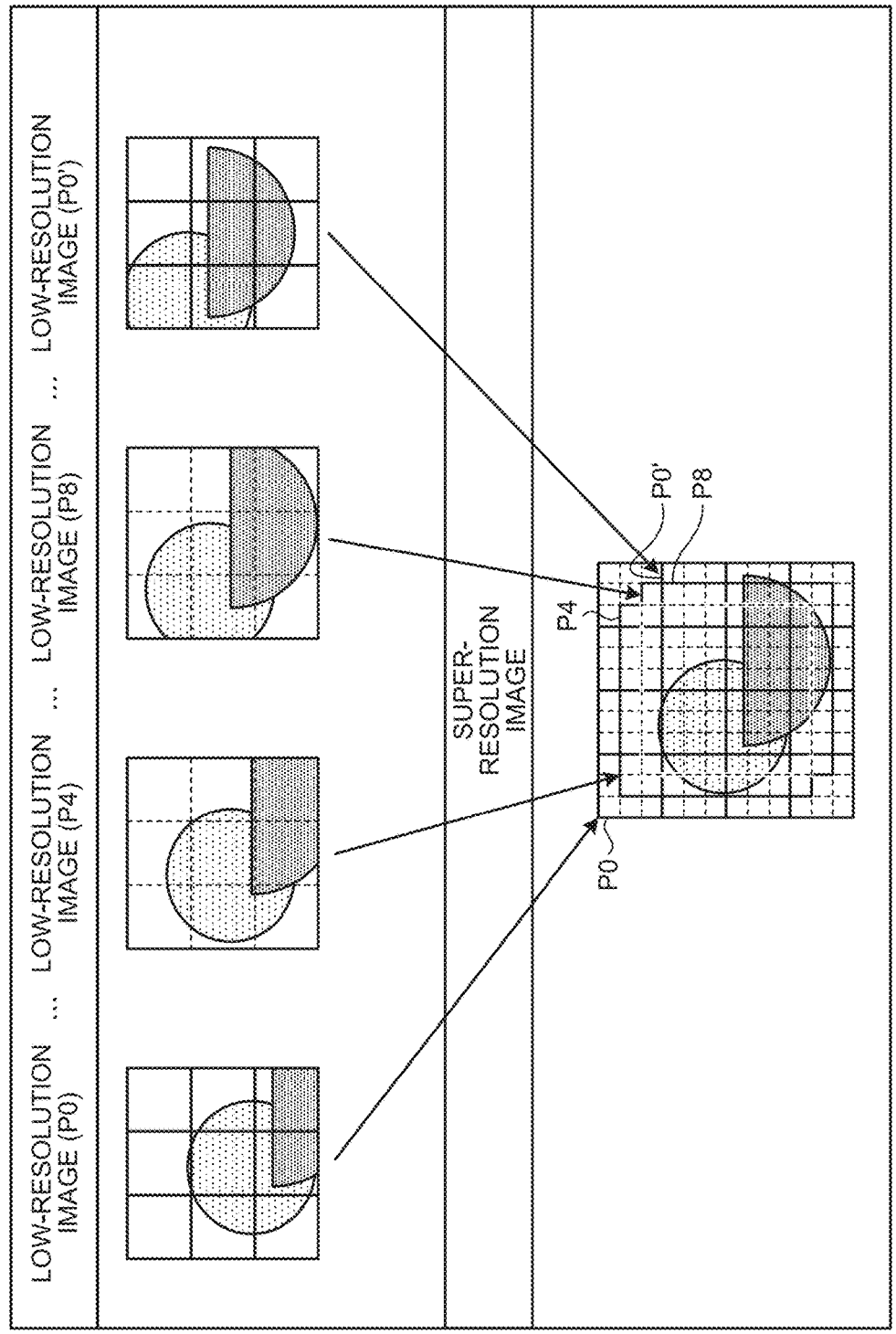
FIG. 22 is a diagram for schematically explaining super-resolution processing using the images illustrated in FIG. 17.

FIG. 22 is a diagram for schematically explaining super-resolution processing using the images illustrated in FIG. 17. By performing the calculation described above, the calculating circuit 92 performs the super-resolution processing of combining the outputs corresponding to the patterns P0 to P8 and serving as the low-resolution images to derive a calculation result having higher resolution as illustrated in FIG. 22. FIG. 22 illustrates that combining the patterns P0 to P8 (including P0') illustrated in the upper part increases the sense of resolution like the super-resolution image illustrated in the lower part. Because the positions of the detection areas corresponding to the patterns P0, P4, P8, and P0' in the upper part are different from one another, the corresponding areas are slightly shifted as illustrated in the lower part. While FIG. 22 illustrates only the patterns P0, P4, P8, and P0', the other patterns P1 to P3 and P5 to P7 are also used in the super-resolution processing.

Figure 23:
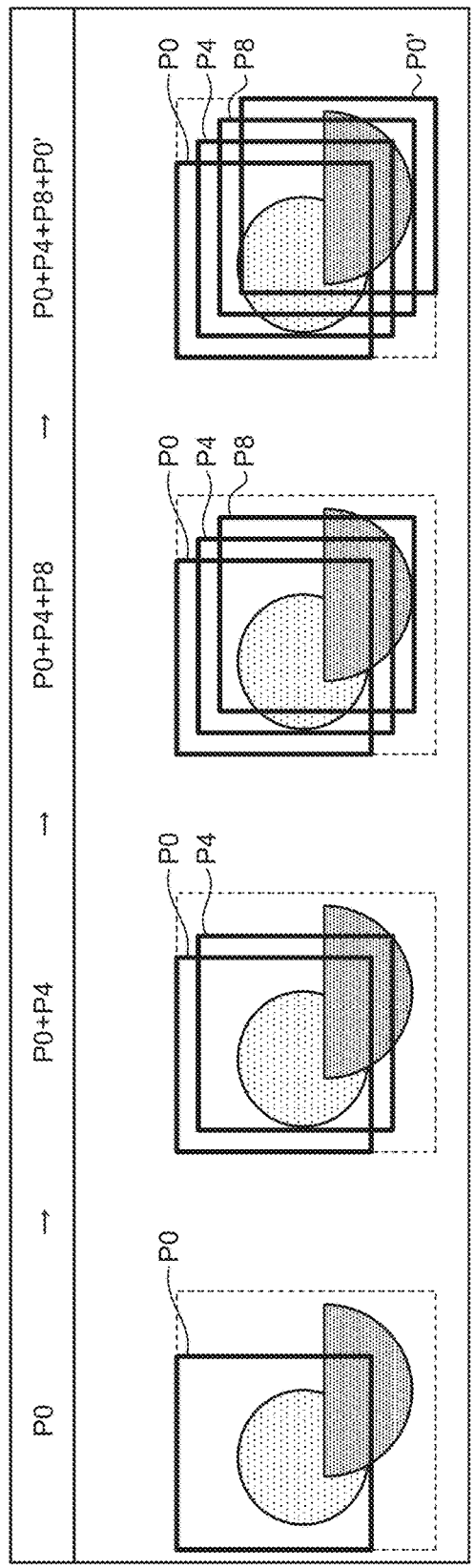
FIG. 23 is a diagram for explaining a mechanism of superimposition of the combinations illustrated in FIG. 22.
Figure 24:
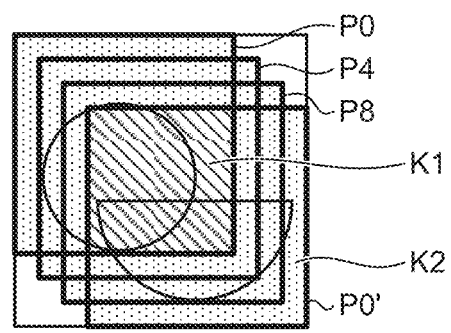
FIG. 24 is an explanatory diagram illustrating, in a distinguished manner, an area in which the low-resolution images of all the patterns illustrated in FIG. 23 are superimposed and an area in which the low-resolution images of part of the patterns are not superimposed.

FIG. 23 is a diagram for explaining a mechanism of superimposition of the combinations illustrated in FIG. 22. FIG. 24 is an explanatory diagram illustrating, in a distinguished manner, an area K1 in which the low-resolution images of all the patterns illustrated in FIG. 23 are superimposed and an area K2 in which the low-resolution images of part of the patterns are not superimposed. In the super-resolution processing, as illustrated in FIG. 23, the touch detecting apparatus superimposes the low-resolution images of the respective patterns (e.g., the patterns P0, P4, P8, and P0') at the positions corresponding to the output coordinates of the integrated data serving as the original data of the low-resolution images. The touch detecting apparatus thus can increase the accuracy of the detection result at the area in which low-resolution images of a plurality of patterns are superimposed. In terms of superimposition of the low-resolution images of the patterns P0, P4, P8, and P0', there are the area K1 and the area K2 as illustrated in FIG. 24. In the area K1, the low-resolution images of all the patterns are superimposed. In the area K2, the low-resolution images of part of the patterns are not superimposed. The area K1 corresponds to an area hatched by oblique lines in FIG. 24. The area K2 corresponds to an area hatched by half-dot meshing in FIG. 24. A case is assumed where the low-resolution images of the patterns P0, P4, P8, and P0' are all the low-resolution images used in the super-resolution processing. In this case, the area K1 has a sufficient amount of information, but the area K2 has an insufficient amount of information. As described above with reference to FIGS. 13 to 15, if a smaller number of detectors 50 than the number of detectors 50 included in a single group remain without being included in any group in both end areas in the alignment direction of the detectors 50 in the generation of a piece of integrated data, the detectors 50 in the both end areas are set into a group, and a piece of integrated data is generated based on the outputs from the detectors 50 in the both end areas. As a result, the same number of low-resolution images as that of the area K1 are superimposed in the area K2. In other words, in the present embodiment, it is possible to prevent generation of an area having an insufficient amount of information.

The initial value ($X_0$) may be any value. The calculating circuit 92, for example, may determine a value indicated by an output obtained from the coupling circuit when one detector 50 is coupled to a corresponding integration line to be the initial value of the output of the detector 50. As described above, the calculating circuit 92 may determine the initial values of the respective detectors 50. Alternatively, the calculating circuit 92 may determine a predetermined value (e.g., 0) independent of the output described above to be the initial value of the detectors 50.

The determining circuit 93 performs determination for redetermining a new value for the initial value corresponding to a predetermined value set for each of the detectors 50, based on the difference between the initial value and the composite value calculated for each of the detectors 50. Specifically, the determining circuit 93 redetermines a new value for an "initial value ($X_n$) prior to the latest calculation" based on the result of comparison of an absolute value ($|X_{n+1}-X_n|$) of the difference between $X_{n+1}$ and $X_n$ obtained before and after the calculation using Expression (1) with a predetermined allowable error. More specifically, if the absolute value of the difference between $X_{n+1}$ and $X_n$ falls below the predetermined allowable error, the determining circuit 93 redetermines the latest $X_{n+1}$ to be the new value for the initial value and ends the processing. In other words, the determining circuit 93 determines the value indicating the output of the detector 50 based on the latest $X_{n+1}$ serving as the initial value at the end of the processing.

The determining circuit 93 causes the calculation to be performed again based on the result of comparison of the difference between the initial value and the composite value with a predetermined threshold. Specifically, the determining circuit 93 causes the calculating circuit 92 to repeat the calculation until the absolute value of the difference between $X_{n+1}$ and $X_n$ falls below the predetermined allowable error. The arithmetic processing circuit 90 performs the generation step by the generating circuit 91, the calculation step by the calculating circuit 92, and the determination step by the determining circuit 93 for each detector 50. As a result, the arithmetic processing circuit 90 derives the initial value of each detector 50 as the value indicating the detection result of the corresponding detector 50. The detection result obtained by combining the initial values resulting from the determination step corresponds to digital data indicating the touch detection result in the detection area (refer to FIG. 26).

The specific conditions for the determining circuit 93 to redetermine the initial value may be appropriately changed. An upper limit may be set on the number of times of repetition of the calculation to be performed until the absolute value of the difference between $X_{n+1}$ and $X_n$ falls below the predetermined allowable error. If the number of times of repetition reaches the upper limit, the determining circuit 93 may redetermine the latest $X_{n+1}$ to be the initial value independently of the relation between the absolute value of the difference between $X_{n+1}$ and $X_n$ and the predetermined allowable error and end the processing. The specific values of the conditions, such as the predetermined allowable error and the number of times of repetition, are desired values. These values may be set to values that produce excellent arithmetic operation results in an experiment, for example.

FIG. 25 is a diagram of another example of the selection patterns and the low-resolution data corresponding to the selection patterns. While the example described with reference to FIGS. 13 to 15 has nine selection patterns (patterns P0 to P8) in which outputs from 3×3 detectors are integrated, the selection patterns may be appropriately changed. The touch detecting apparatus, for example, may handle detection results of the detectors 50 in units of a plurality of rows (e.g., three rows) described with reference to FIG. 6 as a piece of integrated data. In this case, as illustrated in FIG. 25, for example, the touch detecting apparatus can perform the above-mentioned calculation and determination in the column direction using low-resolution data based on the integrated data, such as a pattern Pa of $(y_1,y_2,y_3)$, $(y_4,y_5,y_6)$, . . . , a pattern Pb of $(y_2,y_3,y_4)$, $(y_5,y_6,y_7)$, . . . , and a pattern Pc of $(y_3,y_4,y_5)$, $(y_6,y_7,y_8)$, . . . . In FIG. 25, to distinguish bundled data (A', B', . . . ) corresponding to the patterns Pa, Pb, and Pc, reference numerals PaA', PaB', PbA', PbB', PcA', and PcB' are provided. Needless to say, the relation between the row and the column in the example illustrated in FIG. 25 may be reversed. Even in the processing in units of rows (or units of columns) illustrated in FIG. 25, if a smaller number of detectors 50 than the number of detectors 50 included in a single group are positioned in both end areas in the alignment direction of the detectors, which sandwiches an area in which the detectors included in at least one group are arranged, the outputs from the detectors 50 in the both end areas may be integrated with reference to FIGS. 13 to 15. The integrated data corresponding to the selection patterns illustrated in FIG. 25 can be generated by bundling and shifting in the same manner as that in generation of the low-resolution frame data described with reference to FIG. 7, for example.

Figure 26:
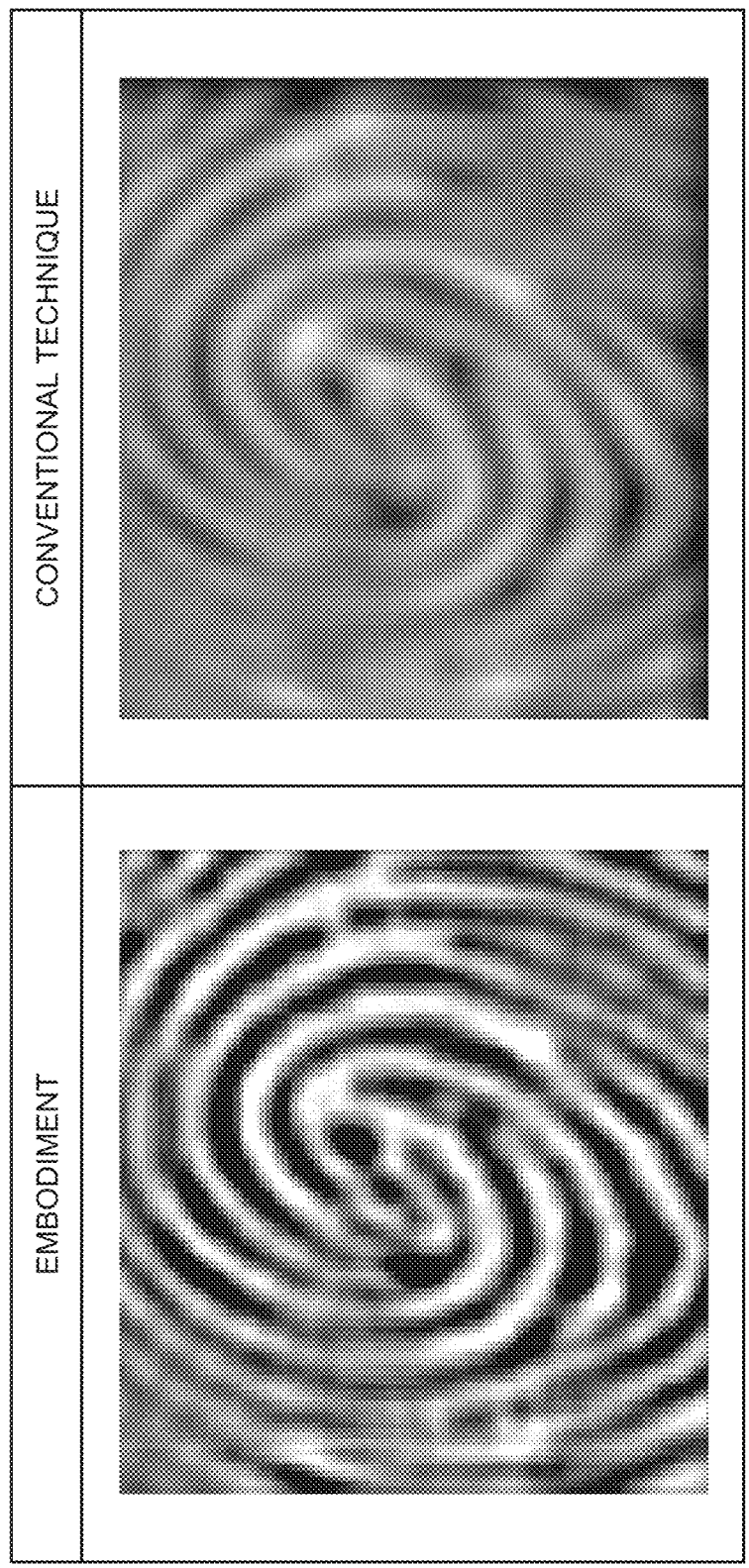
FIG. 26 is a diagram for comparing an example of a touch detection result according to the present embodiment and an example of a touch detection result of a conventional touch detecting apparatus.

FIG. 26 is a diagram for comparing an example of a touch detection result according to the present embodiment and an example of a touch detection result of the conventional touch detecting apparatus. The touch detection result according to the present embodiment illustrated in FIG. 26 is obtained in a case where an upper limit (64) is set on the number of times of repetition of the calculation. As illustrated in FIG. 26, the present embodiment can more clearly detect the unevenness of the detected object.

As described above, according to the present embodiment, generating the integrated output intensifies the output, thereby compensating the detection sensitivity of the individual detectors 50. As a result, even a weak touch operation is more likely to be detected with higher accuracy. Further, according to the present embodiment, the touch detecting apparatus uses the integrated output to perform the generation, the calculation, and the determination, thereby obtaining the detection results having resolution corresponding to the number of detectors 50. Consequently, generating the integrated output can prevent reduction in the sense of resolution, and the detection results with higher accuracy can be obtained. As described above, according to the present embodiment, the accuracy in detecting the shape of the detected object increases.

If a smaller number of detectors 50 than the number of detectors 50 included in a single group are positioned in the both end areas in the alignment direction of the detectors 50, the outputs from the detectors 50 in the both end areas are integrated, the both end areas sandwiching an area in which the detectors 50 included in at least one group are arranged. This operation can make the number of patterns of output data including the outputs from the detectors 50 positioned in the both end areas closer to the number of patterns of output data including the outputs from the detectors 50 positioned in the inner area than the both end areas. According to the present embodiment, it is possible to prevent reduction in the number of patterns of the integrated output of the detectors positioned in the both end areas. Consequently, the accuracy in the entire detection area in which the detectors 50 are arranged increases.

In the present embodiment, the calculation is performed again based on the result of comparison of the difference between the initial value and the composite value with the predetermined threshold. By strictly setting the predetermined threshold, highly accurate detection results can be obtained. In addition, processing for obtaining the detection results considering the trade-off between the accuracy required to redetermine the initial value and the processing load can be performed.

The detectors 50 are arranged in two directions orthogonal to each other. Consequently, the present embodiment can obtain at least two-dimensional information on the detected object.

The touch detecting apparatus of the present embodiment can individually switch, in the two directions, the combinations of the detectors serving as a single group. Consequently, it is possible to facilitate the increase in the number of patterns of the integrated output.

Modifications

Figure 27:
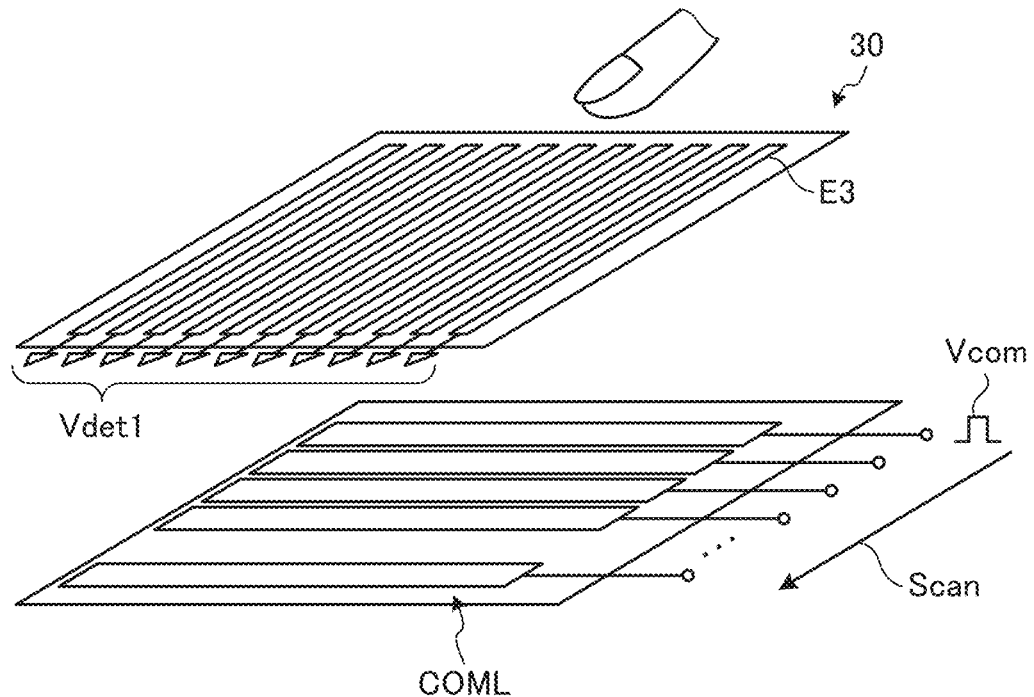
FIG. 27 is a diagram of an exemplary configuration of electrodes provided in a mutual capacitive touch detecting apparatus.
Figure 28:
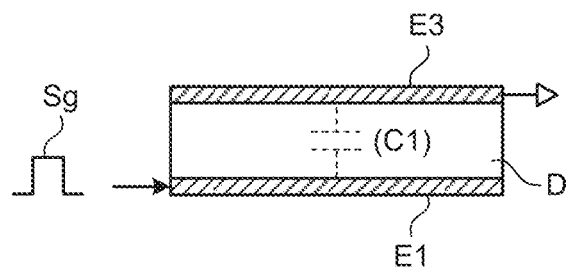
FIG. 28 is a diagram for explaining a basic principle of mutual capacitive touch detection and illustrates a state where a finger is neither in contact with nor in proximity to a touch detection electrode.
Figure 29:
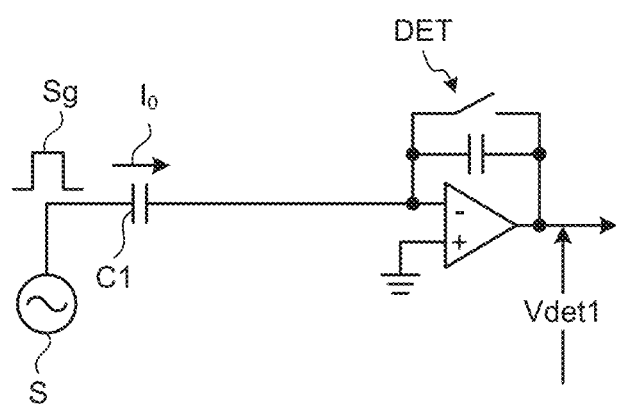
FIG. 29 is a diagram for explaining an example of an equivalent circuit in the state where a finger is neither in contact with nor in proximity to the touch detection electrode as illustrated in FIG. 28.
Figure 30:
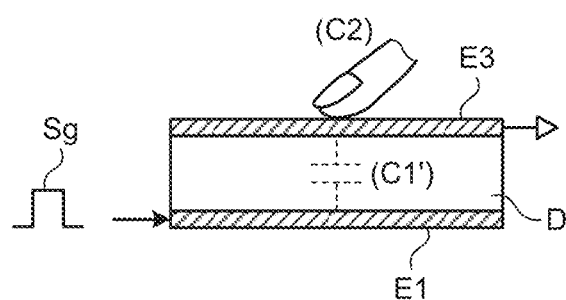
FIG. 30 is a diagram for explaining the basic principle of mutual capacitive touch detection and illustrates a state where a finger is in contact with or in proximity to the touch detection electrode.
Figure 31:
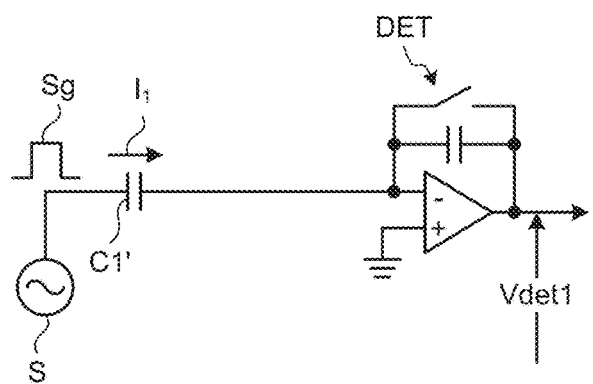
FIG. 31 is a diagram for explaining an example of the equivalent circuit in the state where a finger is in contact with or in proximity to the touch detection electrode as illustrated in FIG. 30.
Figure 32:
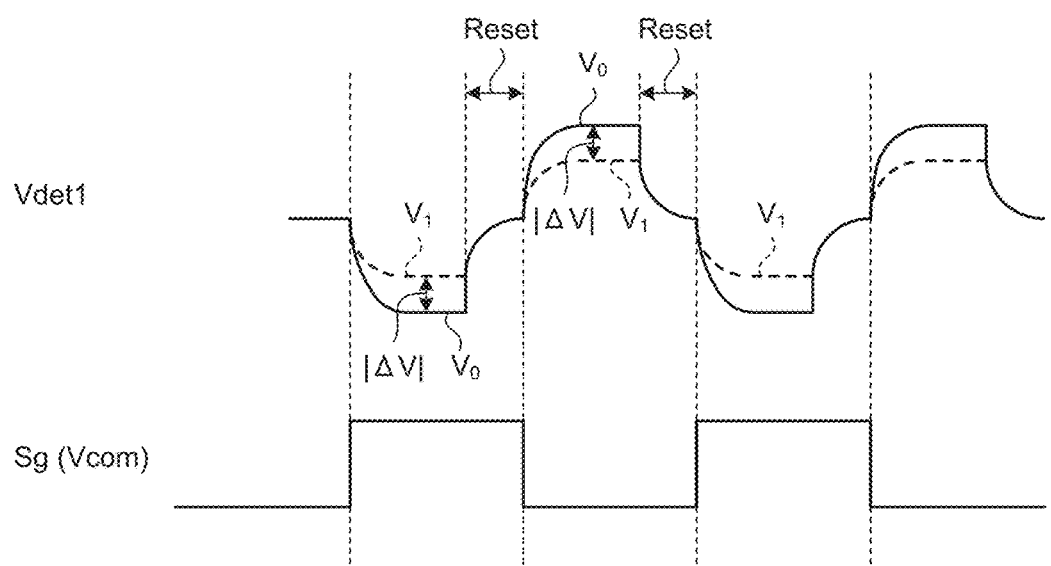
FIG. 32 is a diagram of an example of waveforms of a drive signal and a touch detection signal.

While the detectors 50 according to the embodiment above are a self-capacitive capacitance sensor, they may be a mutual capacitive capacitance sensor. The following describes a basic principle of mutual capacitive touch detection with reference to FIGS. 27 to 32. FIG. 27 is a diagram of an exemplary configuration of electrodes provided in a mutual capacitive touch detecting apparatus. FIG. 28 is a diagram for explaining the basic principle of mutual capacitive touch detection and illustrates a state where a finger is neither in contact with nor in proximity to a touch detection electrode. FIG. 29 is a diagram for explaining an example of an equivalent circuit in the state where a finger is neither in contact with nor in proximity to the touch detection electrode as illustrated in FIG. 28. FIG. 30 is a diagram for explaining the basic principle of mutual capacitive touch detection and illustrates a state where a finger is in contact with or in proximity to the touch detection electrode. FIG. 31 is a diagram for explaining an example of the equivalent circuit in the state where a finger is in contact with or in proximity to the touch detection electrode as illustrated in FIG. 30. FIG. 32 is a diagram of an example of waveforms of a drive signal and a touch detection signal.

The mutual capacitive system uses touch detection electrodes E3 and touch detection drive electrodes COML intersecting with each other, for example. In the example illustrated in FIG. 27, the touch detection electrodes E3 extend in the y-direction, and the touch detection drive electrodes COML extend in the x-direction. The layer provided with the touch detection electrodes E3 is not in contact with the layer provided with the touch detection drive electrodes COML with a predetermined gap interposed therebetween. Each of the touch detection electrodes E3 is supplied with an electric charge (Vx) via a configuration similar to the constant potential line c0. The touch detection drive electrodes COML serve as drive electrodes E1, which will be described later. The touch detection drive electrodes COML may also be used as electrodes that apply voltage to liquid crystals in a liquid crystal display device.

As illustrated in FIG. 28, for example, a capacitance element C1 includes a pair of electrodes, that is, the drive electrode E1 and the touch detection electrode E3 facing each other with a dielectric D interposed therebetween. As illustrated in FIG. 29, a first end of the capacitance element C1 is coupled to an AC signal source (drive signal source) S, whereas a second end thereof is coupled to a voltage detector DET. The voltage detector DET is an integration circuit included in the circuit 55, for example.

When the AC signal source S applies an AC rectangular wave Sg having a predetermined frequency (e.g., a frequency on the order of several kilohertz to several hundred kilohertz) to the drive electrode E1 (first end of the capacitance element C1), an output waveform (first touch detection signal Vdet1) illustrated in FIG. 32 is generated via the voltage detector DET coupled to the touch detection electrode E3 (second end of the capacitance element C1). The AC rectangular wave Sg serves as a drive signal.

In a state where a finger is not in contact with (or in proximity to) the touch detection electrode (non-contact state), an electric current $I_0$ depending on the capacitance value of the capacitance element C1 flows with charge and discharge of the capacitance element C1 as illustrated in FIGS. 28 and 29. The voltage detector DET illustrated in FIG. 29 converts change in the electric current $I_0$ depending on the AC rectangular wave Sg into change in voltage (waveform $V_0$ indicated by the solid line (refer to FIG. 32)).

By contrast, in a state where a finger is in contact with (or in proximity to) the touch detection electrode (contact state), capacitance C2 formed by the finger is in contact with or in proximity to the touch detection electrode E3 as illustrated in FIG. 30. In this state, fringe capacitance between the drive electrode E1 and the touch detection electrode E3 is blocked. As a result, the capacitance element C1 acts as a capacitance element C1' having a capacitance value smaller than that of the capacitance element C1. In the equivalent circuit illustrated in FIG. 31, an electric current $I_1$ flows through the capacitance element C1'. As illustrated in FIG. 32, the voltage detector DET converts change in the electric current $I_1$ depending on the AC rectangular wave Sg into change in voltage (waveform $V_1$ indicated by the dotted line). In this case, the waveform $V_1$ has amplitude smaller than that of the waveform $V_0$. An absolute value $|\Delta V|$ of the voltage difference between the waveform $V_0$ and the waveform $V_1$ varies depending on an effect of an external conductor, such as a finger, in proximity to the touch detection electrode. To accurately detect the absolute value $|\Delta V|$ of the voltage difference between the waveform $V_0$ and the waveform $V_1$, the voltage detector DET preferably operates having a period Reset for resetting charge and discharge of a capacitor based on the frequency of the AC rectangular wave Sg by switching in the circuit.

The touch detection electrodes E3 output the first touch detection signals Vdet1 of respective detection blocks via the voltage detector DET illustrated in FIG. 29 or 31 and supply them to the input side of the coupling circuits $D_1, D_2, \ldots,$ and $D_r$ in the selector 70.

A circuit provided between the selector 70 and the A/D converter 80 may amplify the first touch detection signals Vdet1. The circuit may include an analog low-pass filter (LPF) serving as a low-pass analog filter that removes high-frequency components (noise components) included in the first touch detection signals Vdet1 and outputs the remaining components.

The arithmetic processing circuit 90 may include a digital filter that reduces frequency components (noise components) that are included in the output signal from the A/D converter 80 and have frequencies other than the frequency at which first drive signal Vcom is sampled. The arithmetic processing circuit 90 determines whether a touch operation is performed on a touch panel 30 based on the output signals from the A/D converter 80. The arithmetic processing circuit 90 performs processing of extracting the difference between the detection signals caused by a finger. The signal of difference caused by a finger corresponds to the absolute value $|\Delta V|$ of the difference between the waveform $V_0$ and the waveform $V_1$. The arithmetic processing circuit 90 may perform an arithmetic operation for averaging the absolute value $|\Delta V|$ per detection block, thereby calculating the average of the absolute value $|\Delta V|$. With this operation, the arithmetic processing circuit 90 can reduce an effect of noise. The arithmetic processing circuit 90 compares the detected signal of difference caused by a finger with predetermined threshold voltage. If the signal of difference is lower than the threshold voltage, the arithmetic processing circuit 90 determines that an external proximate object is in the non-contact state. By contrast, if the signal of difference is equal to or higher than the threshold voltage, the arithmetic processing circuit 90 determines that an external proximate object is in the contact state.

When a touch operation is detected, the arithmetic processing circuit 90 derives the coordinates based on the outputs from the touch detection electrodes E3. The electrode patterns intersecting with each other according to the modification serve as a detection area formed in a matrix. A combination of one of the touch detection electrodes E3 and one of the touch detection drive electrodes COML serves as one detector 50. By scanning the entire detection area based on the output of the drive signal, the touch detecting apparatus of the modification can detect a position at which an external proximate object is in contact with or in proximity to the detection area.

The touch detecting apparatus of the modification employs a mechanism that changes the detectors 50 handled as a group by switching the touch detection drive electrodes COML to be a target to which the drive signal is output. The method of switching the groups may be appropriately changed. The outputs from the touch detection electrodes E3 may be supplied to the selector 70 according to the embodiment above, for example, and the groups may be switched based not only on the positions of the touch detection drive electrodes COML (y-direction) but also on the positions of the touch detection electrodes E3 (x-direction).

The specific configuration of the touch detection electrodes E3 and the touch detection drive electrodes COML illustrated in FIG. 27 is given by way of example only. The present invention is not limited thereto, and the configuration may be appropriately changed. The touch detection electrodes E3 and the touch detection drive electrodes COML may be provided in a single layer in parallel, for example.

The embodiment and the modification described above are given by way of example only, and the present invention is not limited thereto. The configuration may be appropriately changed within the range specified by the invention specification items described in the claims. The detectors 50 aligned in the y-direction according to the embodiment above share the signal line, for example. This is given as an example of a form of wiring that couples the detectors 50 to the coupling circuits $D_1, D_2, \ldots,$ and $D_r$ in the selector 70, and the present invention is not limited thereto. The coupling relation between the detectors 50 and the coupling circuits $D_1, D_2, \ldots,$ and $D_r$ in the selector 70 may be appropriately changed. The detectors 50, for example, may be coupled to the input side of the coupling circuits $D_1, D_2, \ldots,$ and $D_r$ via respective pieces of wiring.

While the touch detecting apparatus of the embodiment above switches the detectors 50 to be handled as a group in both x-direction and y-direction, the detectors 50 may be switched only in one direction. In a case where the detectors 50 are shifted by switching the output patterns of the drive signal only in the y-direction, for example, the selector 70 in not required. In a case where the detectors 50 are switched only in the x-direction, the drive signal may be output to all the scanning lines $G_1, G_2, \ldots,$ and $G_q$ at a time.

Other advantageous effects that are provided by the aspects according to the embodiment and that are obvious from the present specification or appropriately conceivable by those skilled in the art are naturally provided by the present invention.

What is claimed is:

1. A touch detecting apparatus comprising: a plurality of detectors that are three or more detectors and aligned in at least one direction and that individually detect a touch operation; a generating circuit that performs generation for generating a plurality of low-resolution data patterns each having resolution lower than resolution corresponding to the number of the detectors based on outputs from the detectors;
   a calculating circuit that performs calculation for calculating, for each of the detectors, a composite value to be used to derive a detection result of each of the detectors based on the low-resolution data patterns; and
   a determining circuit that performs determination for re-determining a new value for an initial value corresponding to a predetermined value set for each of the detectors, based on a difference between the initial value and the composite value calculated for each of the detectors,
   wherein a first output is obtained by integrating outputs from a plurality of first detectors that are a group of the detectors consecutively aligned in a first number of rows adjacent to each other, the first number being constant and no less than three,
   wherein the first detectors aligned in the first number of rows are driven simultaneously and shifted sequentially by a predetermined shift amount in a shift direction, wherein the generating circuit generate each of the low-resolution data patterns by integrating a plurality of the first outputs, the low-resolution data patterns including at least a first pattern, a second pattern, and a third pattern,
   wherein a combination of the first detectors of the first pattern, a combination of the first detectors of the second pattern, a combination of the first detectors of the third pattern are different from each other, wherein an arrangement of the first detectors of the second pattern is shifted by the predetermined shift amount form an arrangement of the first detectors of the first pattern, and an arrangement of the first detectors of the third pattern is shifted from the arrangement of the first detectors of the second pattern by the predetermined shift amount,
   wherein the predetermined shift amount is smaller than a length of an area of the first detectors of the first number of rows in the shift direction, the low-resolution data patterns including the first pattern, second pattern, and a third pattern are integrated to generate a single image.

2. The touch detecting apparatus according to claim 1, wherein, when a smaller number of the detectors than the number of the detectors included in a single group are positioned in both end areas in the alignment direction of the detectors, outputs from the detectors included in the both end areas are integrated, the both end areas sandwiching an area in which the detectors included in at least one group are arranged.

3. The touch detecting apparatus according to claim 1, wherein the determining circuit causes the calculation to be performed again based on a result of comparison of the difference between the initial value and the composite value with a predetermined threshold.

4. The touch detecting apparatus according to claim 1, wherein the detectors are arranged in two directions orthogonal to each other.

5. The touch detecting apparatus according to claim 4, further comprising a selecting device capable of individually switching, in the two directions, the combinations of the detectors serving as a single group.

6. The touch detecting apparatus according to claim 1, wherein the detectors are a self-capacitive capacitance sensor.

7. The touch detecting apparatus according to claim 1, wherein the detectors are a mutual capacitive capacitance sensor.

8. A touch detection method for performing touch detection based on outputs from a plurality of detectors that are three or more detectors and aligned in at least one direction and that individually detect a touch operation, the touch detection method comprising: generating a plurality of low-resolution data patterns each having resolution lower than resolution corresponding to the number of the detectors based on outputs from the detectors; calculating, for each of the detectors, a composite value to be used to derive a detection result of each of the detectors based on the low-resolution data patterns; and re-determining a new value for an initial value corresponding to a predetermined value set for each of the detectors based on difference between the initial value and the composite value calculated for each of the detectors, wherein a first output is obtained by integrating outputs from a plurality of first detectors group that are a group of the detectors consecutively aligned in a first number of rows adjacent to each other, the first number being constant and no less than three, wherein the first detectors aligned in the first number of rows are driven simultaneously and shifted sequentially by a predetermined shift amount in a shift direction, wherein a plurality of the first outputs are integrated to generate each of the low-resolution data patterns including at least a first pattern, a second pattern, and a third pattern, wherein a combination of the first detectors of the first pattern, a combination of first detectors of the second pattern, a combination of the first detectors of the third pattern are different from each other, wherein an arrangement of the first detectors of the second pattern is shifted by the predetermined shift amount form an arrangement of the first detectors of the first pattern, and an arrangement of the first detectors of the third pattern is shifted from the arrangement of the first detectors of the second pattern by the predetermined shift amount, wherein the predetermined shift amount is smaller than a length of an area of the first detectors of the first number of rows in the shift direction, and the low-resolution data patterns including the first pattern, second pattern, and a third pattern are integrated to generate a single image.

* * * * *